US010289755B2

(12) United States Patent
Sugiura

(10) Patent No.: US 10,289,755 B2
(45) Date of Patent: May 14, 2019

(54) THREE-DIMENSIONAL FABRICATING SYSTEM, INFORMATION PROCESSING APPARATUS, THREE-DIMENSIONAL FABRICATING MODEL ARRANGEMENT METHOD, AND THREE-DIMENSIONAL FABRICATING MODEL ARRANGEMENT PROGRAM

(71) Applicant: TECHNOLOGY RESEARCH ASSOCIATION FOR FUTURE ADDTIVE MANUFACTURING, Tokyo (JP)

(72) Inventor: Yukito Sugiura, Kanagawa (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 397 days.

(21) Appl. No.: 14/908,397

(22) PCT Filed: Jan. 30, 2015

(86) PCT No.: PCT/JP2015/052762
§ 371 (c)(1),
(2) Date: Jan. 28, 2016

(87) PCT Pub. No.: WO2016/121120
PCT Pub. Date: Aug. 4, 2016

(65) Prior Publication Data
US 2016/0371398 A1 Dec. 22, 2016

(51) Int. Cl.
*G06F 17/50* (2006.01)
*B33Y 30/00* (2015.01)
(Continued)

(52) U.S. Cl.
CPC ............ *G06F 17/50* (2013.01); *B33Y 30/00* (2014.12); *B33Y 50/00* (2014.12); *B33Y 50/02* (2014.12); *G06F 2217/12* (2013.01)

(58) Field of Classification Search
USPC ................. 703/2, 1; 345/419, 420; 348/148
See application file for complete search history.

(56) References Cited

U.S. PATENT DOCUMENTS 6,980,934 B1   12/2005   Sadovnik
7,082,387 B1    7/2006   Wolfe, Jr.
(Continued)

FOREIGN PATENT DOCUMENTS

JP   2001-249958 A    9/2001
JP    2007-21922 A    2/2007
(Continued)

OTHER PUBLICATIONS

Supplementary European Search Report dated Dec. 11, 2017 for EP Application No. 15 812 931.2.
(Continued)

*Primary Examiner* — Thai Q Phan
(74) *Attorney, Agent, or Firm* — Ladas & Parry LLP

(57) ABSTRACT

An apparatus according to this invention is an information processing apparatus that efficiently combines and arranges a plurality of three-dimensional fabricating models by simple processing. The information processing apparatus includes a grid generator that generates three-dimensional grids by dividing a three-dimensional virtual area by a predetermined size, a converter that converts a plurality of three-dimensional fabricating models into aggregate models of the three-dimensional grids respectively including the three-dimensional fabricating models, a moving unit that relatively moves the aggregate models without overlapping each other, and an arrangement determiner that determines,
(Continued)

if an arrangement of the aggregate models satisfies a predetermined condition, the arrangement of the aggregate models as an arrangement of the plurality of three-dimensional fabricating models.

19 Claims, 25 Drawing Sheets

(51) Int. Cl.
*B33Y 50/02* (2015.01)
*B33Y 50/00* (2015.01)

(56) References Cited

U.S. PATENT DOCUMENTS

| | | | | |
|---|---|---|---|---|
| 9,123,161 | B2* | 9/2015 | Adair | G06T 19/00 |
| 9,274,251 | B2* | 3/2016 | Pasken | G01W 1/00 |
| 2007/0233298 | A1 | 10/2007 | Heide et al. | |
| 2010/0194743 | A1* | 8/2010 | Glueck | G06T 15/20 |
| | | | | 345/419 |
| 2010/0194744 | A1* | 8/2010 | Glueck | G06T 15/20 |
| | | | | 345/419 |
| 2013/0120379 | A1* | 5/2013 | Adair | G06T 19/00 |
| | | | | 345/420 |
| 2013/0338920 | A1* | 12/2013 | Pasken | G01W 1/00 |
| | | | | 702/3 |
| 2014/0081603 | A1 | 3/2014 | Griffith et al. | |
| 2014/0319716 | A1 | 10/2014 | Shtilerman | |
| 2016/0034771 | A1* | 2/2016 | Schamp | G01B 11/2545 |
| | | | | 348/148 |

FOREIGN PATENT DOCUMENTS

| | | |
|---|---|---|
| JP | 2009-532804 A | 9/2009 |
| JP | 5615668 B2 | 9/2014 |
| JP | 2015-16680 A | 1/2015 |

OTHER PUBLICATIONS

Patent Abstracts of Japan English abstract of JP 2007-21922 A.
Netfabb Professional 5.2 User Manual, Chapter 5: Part Management; 5.5 Position and Scale ED—netfabb GmbH, pp. 1, 68-73, Jul. 29, 2014, XP002748116.
International Search Report dated Apr. 22, 2015 for International Application No. PCT/JP2015/052762.
J-PlatPat English abstract of JP 2012-096427 A which corresponds to JP 5615668 B2.
Takahiro Nozawa, "Research of the Approximation Algorithm in a Cramming Problem", Graduate School of Engineering and Design, Hosei University, vol. 3 (Mar. 2014).
J-PlatPat English abstract of JP 2015-16680 A.
J-PlatPat English abstract of JP 2001-249958 A.

* cited by examiner

451

| ARRANGEMENT CONTROL ALGORITHM ID | ARRANGEMENT PROCESSING CONDITION ||||| ARRANGEMENT CONTROL PROGRAM |
| --- | --- | --- | --- | --- | --- | --- |
| | ARRANGEMENT ACCURACY | ARRANGEMENT SPEED | THREE-DIMENSIONAL FABRICATING MODEL COUNT | THREE-DIMENSIONAL FABRICATING APPARATUS TO BE USED | ... | |
| | | | | | | |
| ⋮ | | | | | | |

501 502 503

F I G. 5

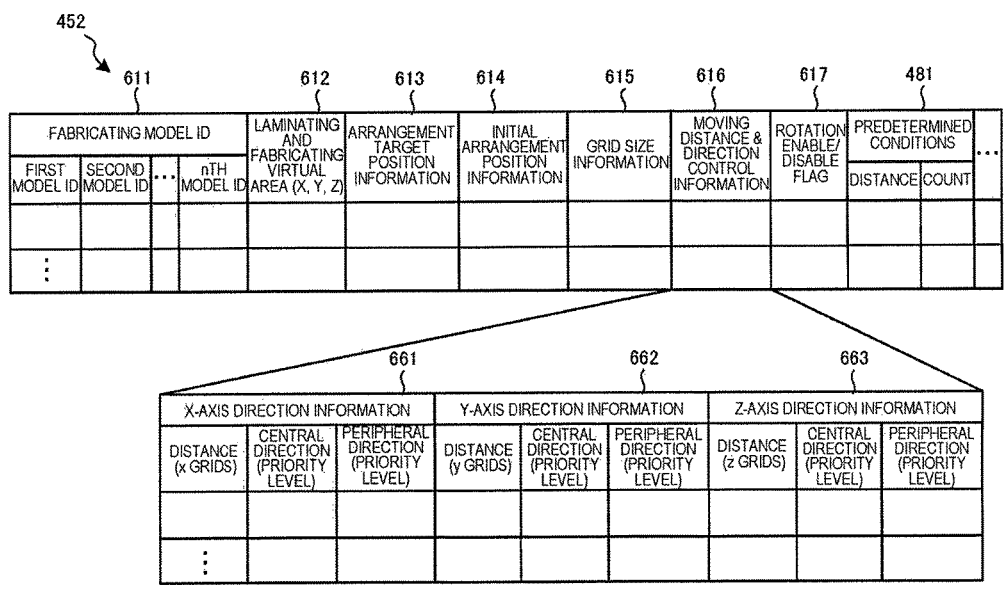
F I G. 6A

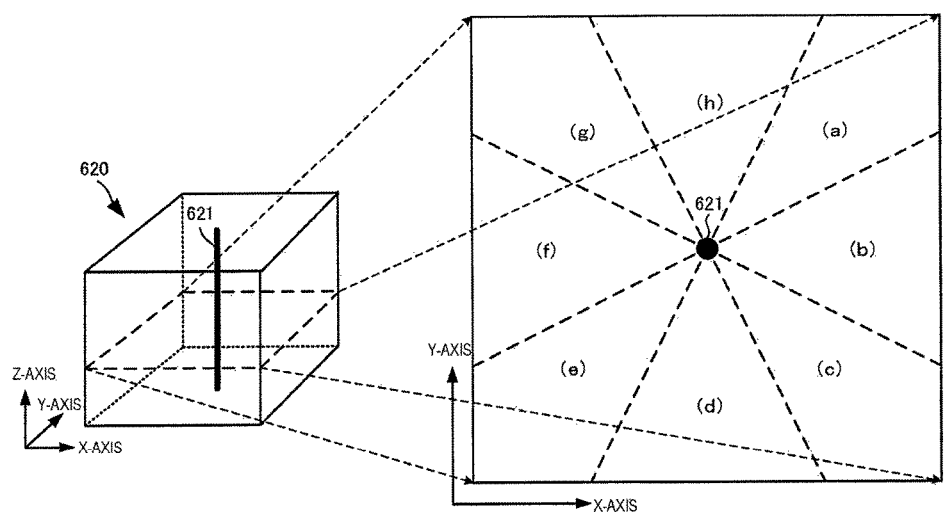
F I G. 6B

|  |  | CURRENT REGION OF AGGREGATE MODEL | | | | | | | |
|---|---|---|---|---|---|---|---|---|---|
| | | (a) | (b) | (c) | (d) | (e) | (f) | (g) | (h) |
| PRIORITY | 1 | (-1,-1) | (-1, 0) | (-1, 1) | ( 0, 1) | ( 1, 1) | ( 1, 0) | ( 1,-1) | ( 0,-1) |
| | 2 | (-1, 0) | (-1, 1) | ( 0, 1) | ( 1, 1) | ( 1, 0) | ( 1,-1) | ( 0,-1) | (-1,-1) |
| | 3 | ( 0,-1) | (-1,-1) | (-1, 0) | (-1, 1) | ( 0, 1) | ( 1, 1) | ( 1, 0) | ( 1,-1) |
| | 4 | (-1, 1) | ( 0, 1) | ( 1, 1) | ( 1, 0) | ( 1,-1) | ( 0,-1) | (-1,-1) | (-1, 0) |
| | 5 | ( 1,-1) | ( 0,-1) | (-1,-1) | (-1, 0) | (-1, 1) | ( 0, 1) | ( 1, 1) | ( 1, 0) |
| | 6 | ( 1, 0) | ( 1, 1) | ( 1, 0) | ( 1,-1) | ( 0,-1) | (-1,-1) | (-1, 0) | (-1, 1) |
| | 7 | ( 0, 1) | ( 1,-1) | ( 0,-1) | (-1,-1) | (-1, 0) | (-1, 1) | ( 0, 1) | ( 1, 1) |
| | 8 | ( 1, 1) | ( 1, 0) | ( 1,-1) | ( 0,-1) | (-1,-1) | (-1, 0) | (-1, 1) | ( 0, 1) |

| MOVING PROCESSING | PERMITTED | PROHIBITED |
|---|---|---|
| Z DIRECTION | -Z, -(Z-1), -(Z-2),···, 0 | O |
| (HORIZONTAL) ROTATION IN X AND Y DIRECTIONS | -90(Ph), +90(Ph), 0(1-Ph) | O |
| (VERTICAL) ROTATION IN Z DIRECTION | -90(Pv), +90(Pv), 0(1-Pv) | O |

F I G. 6C

| | | CURRENT REGION OF AGGREGATE MODEL | | | | | | | | | |
|---|---|---|---|---|---|---|---|---|---|---|---|
| | | (A) | (B) | ... | (H) | (I) | (J) | ... | (Q) | (R) | ... | (Z) |
| PRIORITY | 1 | (-1,-1,-1) | (-1, 0,-1) | | ( 0,-1,-1) | ( 0, 0,-1) | (-1,-1, 0) | | ( 0,-1, 0) | (-1,-1, 1) | | ( 0, 0, 1) |
| | 2 | (-1, 0,-1) | (-1, 1,-1) | | (-1,-1,-1) | ( 1, 0,-1) | (-1, 0, 0) | | (-1,-1, 0) | (-1, 0, 1) | | (-1, 0, 1) |
| | 3 | ( 0,-1,-1) | (-1,-1,-1) | | ( 1,-1,-1) | ( 0, 1,-1) | ( 0,-1, 0) | | ( 1,-1, 0) | ( 0,-1, 1) | | ( 0,-1, 1) |
| | 4 | (-1, 1,-1) | ( 0, 1,-1) | | (-1, 0,-1) | (-1, 0,-1) | (-1, 1, 0) | | (-1, 0, 0) | (-1, 1, 1) | | ( 1, 0, 1) |
| | 5 | ( 1,-1,-1) | ( 0,-1,-1) | | ( 1, 0,-1) | ( 0,-1,-1) | ( 1,-1, 0) | | ( 1, 0, 0) | ( 1,-1, 1) | | ( 0, 1, 1) |
| | 6 | ( 1, 0,-1) | ( 1, 1,-1) | | (-1, 1,-1) | ( 1, 1,-1) | ( 1, 0, 0) | | (-1, 1, 0) | ( 1, 0, 1) | | (-1,-1, 1) |
| | 7 | ( 0, 1,-1) | ( 1,-1,-1) | | ( 1, 1,-1) | (-1,-1,-1) | ( 0, 1, 0) | | ( 1, 1, 0) | ( 0, 1, 1) | | ( 1, 1, 1) |
| | 8 | ( 1, 1,-1) | ( 1, 0,-1) | | ( 0, 1,-1) | ( 0, 0, 1) | ( 1, 1, 0) | | ( 0, 1, 0) | ( 1, 1, 1) | | ( 0, 0,-1) |
| | ⋮ | | | | | | | | | | | |
| | 26 | ( 1, 1, 1) | ( 1, 0, 1) | | ( 0, 1, 1) | (-1,-1, 1) | ( 1, 1, 1) | | ( 0, 1, 1) | ( 1, 1,-1) | | ( 0, 1,-1) |

F I G. 6E

453

| THREE-DIMENSIONAL FABRICATING MODEL ID | DATA FORMAT | LAMINATING WIDTH RANGE | ... | THREE-DIMENSIONAL FABRICATING MODEL DATA |
|---|---|---|---|---|
| | STL | | | |
| | DXF | | | |
| ⋮ | | | | |

| 1000 | | | | | | | 1003 | 1004 |
|---|---|---|---|---|---|---|---|---|
| FIRST AGGREGATE MODEL (1001) | | | ... | nTH AGGREGATE MODEL (1002) | | | OVERLAP DETERMINATION RESULT | PREDETERMINED CONDITION FLAG |
| MODEL DATA BEFORE MOVEMENT | MOVING DIRECTION | MODEL DATA AFTER MOVEMENT | ... | MODEL DATA BEFORE MOVEMENT | MOVING DIRECTION | MODEL DATA AFTER MOVEMENT | | |
|  |  |  |  |  |  |  |  |  |
| ⋮ |  |  |  |  |  |  |  |  |

F I G. 10

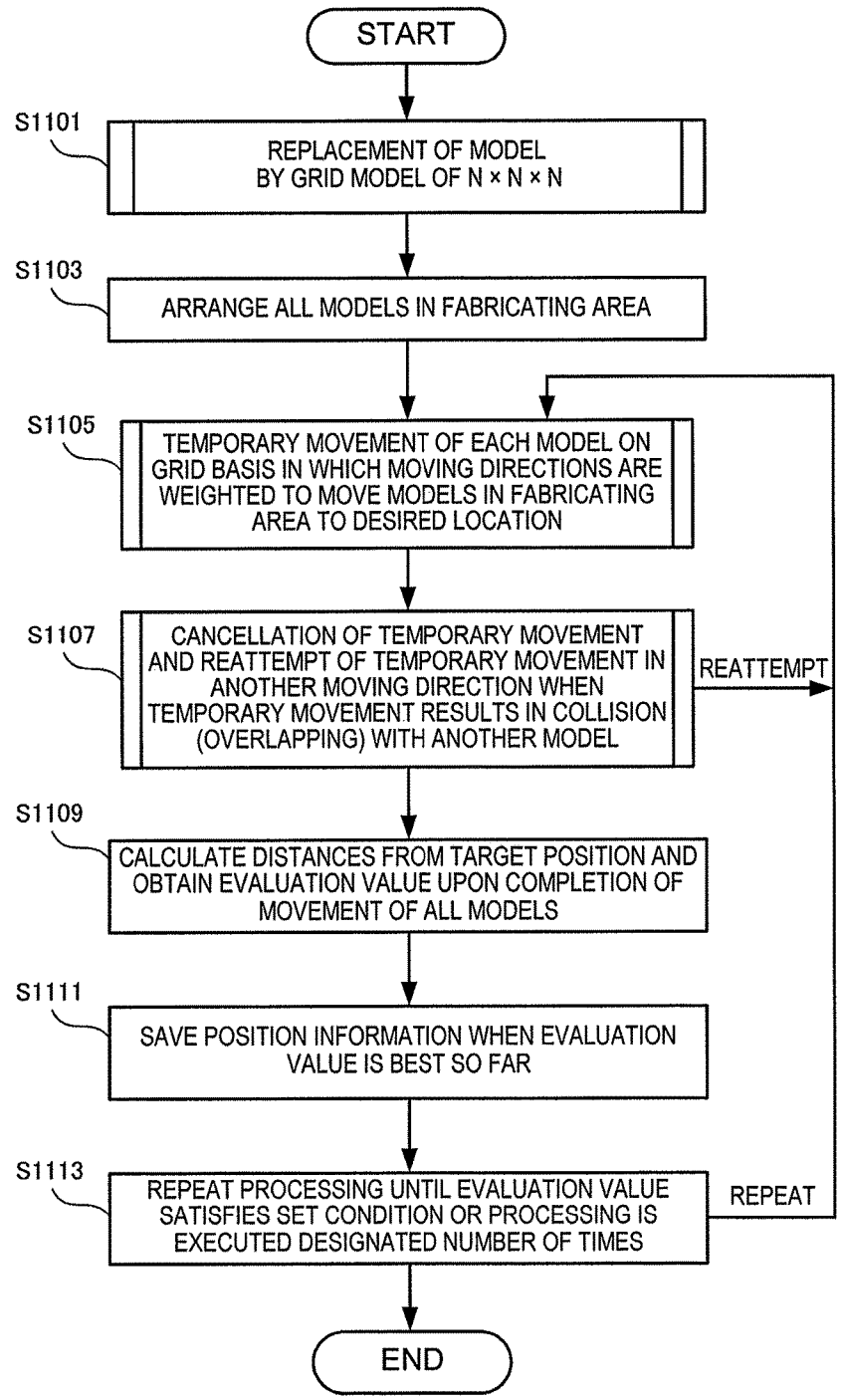
F I G. 11

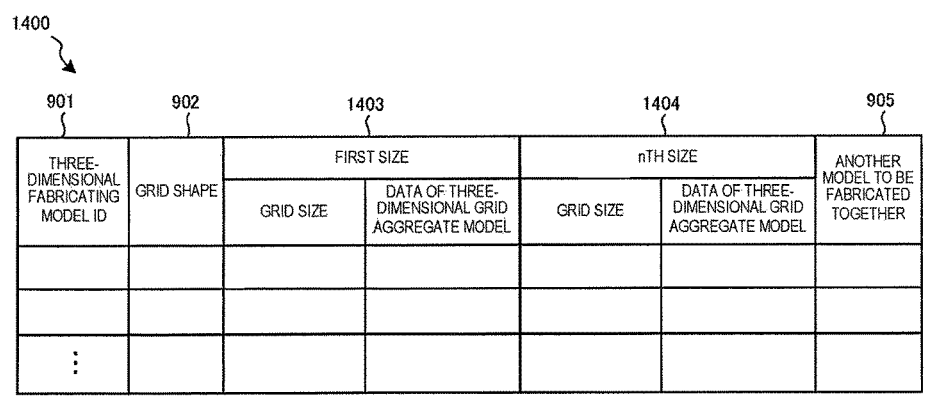
F I G. 14

| 1800 ↙ | | | | | | | | | | 1003 | 1004 |
| --- | --- | --- | --- | --- | --- | --- | --- | --- | --- | --- | --- |
| FIRST AGGREGATE MODEL 1801 | | | | ... | nTH AGGREGATE MODEL 1802 | | | | OVERLAP DETERMINATION RESULT | PRE-DETERMINED CONDITION FLAG |
| MODEL DATA BEFORE MOVEMENT | PRIORITY ARRANGEMENT/ DISABLED ARRANGEMENT | MOVING DIRECTION | MODEL DATA AFTER MOVEMENT | ... | MODEL DATA BEFORE MOVEMENT | PRIORITY ARRANGEMENT/ DISABLED ARRANGEMENT | MOVING DIRECTION | MODEL DATA AFTER MOVEMENT | | |
| | | | | | | | | | | | |
| ⋮ | | | | | | | | | | | |

F I G. 18

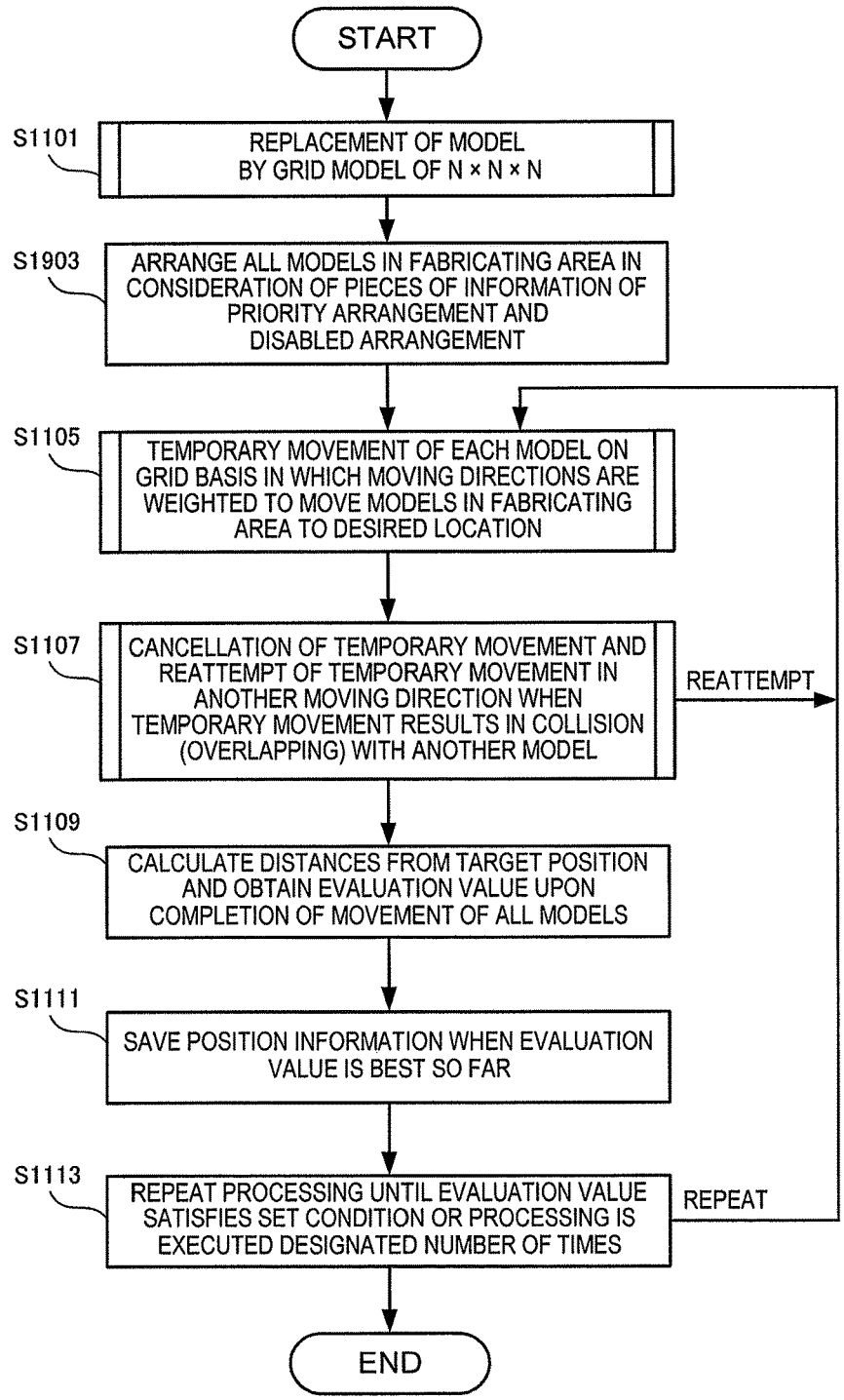
F I G. 19

THREE-DIMENSIONAL FABRICATING SYSTEM, INFORMATION PROCESSING APPARATUS, THREE-DIMENSIONAL FABRICATING MODEL ARRANGEMENT METHOD, AND THREE-DIMENSIONAL FABRICATING MODEL ARRANGEMENT PROGRAM

RELATED APPLICATION

This application is an application under 35 U.S.C. 371 of International Application No. PCT/JP2015/052762 filed on Jan. 30, 2015, the entire contents of which are incorporated herein by reference.

TECHNICAL FIELD

The present invention relates to a technique for arranging three-dimensional fabricating models.

BACKGROUND ART

In the above technical field, non-patent literature 1 discloses a technique of solving a two-dimensional plane cramming problem by approximating graphics by an aggregate of squares using the NF (Next-Fit Algorithm) method and BLF (Bottom-Left-Fill) method. Patent literature 1 discloses a technique of combining and arranging a plurality of three-dimensional fabricating models by moving them on a work space in a three-dimensional printer.

CITATION LIST

Patent Literature

Patent literature 1: Japanese Patent No. 5615668

Non-Patent Literature

Non-patent literature 1: Takahiro Nozawa, "Research of the Approximation Algorithm in a Cramming Problem", Graduate School of Engineering and Design, Hosei University, Vol. 3 (March 2014).

SUMMARY OF THE INVENTION

Technical Problem

In the techniques described in the above literatures, however, it is impossible to efficiently combine and arrange a plurality of three-dimensional fabricating models by simple processing.

The present invention enables to provide a technique of solving the above-described problem.

Solution to Problem

One aspect of the present invention provides an information processing apparatus comprising:

a grid generator that generates three-dimensional grids by dividing a three-dimensional virtual area by a predetermined size;

a converter that converts a plurality of three-dimensional fabricating models into aggregate models of the three-dimensional grids respectively including the three-dimensional fabricating models;

a moving unit that relatively moves the aggregate models without overlapping each other; and an arrangement determiner that determines, if an arrangement of the aggregate models satisfies a predetermined condition, the arrangement of the aggregate models as an arrangement of the plurality of three-dimensional fabricating models.

Another aspect of the present invention provides a three-dimensional fabricating model arrangement method comprising:

generating three-dimensional grids by dividing a three-dimensional virtual area by a predetermined size;

converting a plurality of three-dimensional fabricating models into aggregate models of the three-dimensional grids respectively including the three-dimensional fabricating models;

relatively moving the aggregate models without overlapping each other; and determining, if an arrangement of the aggregate models satisfies a predetermined condition, the arrangement of the aggregate models as an arrangement of the plurality of three-dimensional fabricating models.

Still other aspect of the present invention provides a three-dimensional fabricating model arrangement program for causing a computer to execute a method, comprising:

generating three-dimensional grids by dividing a three-dimensional virtual area by a predetermined size;

converting a plurality of three-dimensional fabricating models into aggregate models of the three-dimensional grids respectively including the three-dimensional fabricating models;

relatively moving the aggregate models without overlapping each other; and determining, if an arrangement of the aggregate models satisfies a predetermined condition, the arrangement of the aggregate models as an arrangement of the plurality of three-dimensional fabricating models.

Still other aspect of the present invention provides a three-dimensional fabricating system comprising:

a model generator that generates three-dimensional fabricating models from data representing three-dimensional fabricated objects;

a model arrangement unit that arranges the plurality of three-dimensional fabricating models in a three-dimensional virtual area corresponding to a fabricating area where the three-dimensional fabricated objects are fabricated; and a laminating and fabricating unit that fabricates the plurality of three-dimensional fabricated objects in the virtual area according to a result of arranging the plurality of three-dimensional fabricating models by said model arrangement unit, said model arrangement unit including a grid generator that generates three-dimensional grids by dividing the three-dimensional virtual area by a predetermined size, a converter that converts the plurality of three-dimensional fabricating models into aggregate models of the three-dimensional grids respectively including the three-dimensional fabricating models;

a moving unit that relatively moves the aggregate models without overlapping each other; and an arrangement determiner that determines, if an arrangement of the aggregate models satisfies a predetermined condition, the arrangement of the aggregate models as an arrangement of the plurality of three-dimensional fabricating models.

Advantageous Effects of Invention

According to the present invention, it is possible to efficiently combine and arrange a plurality of three-dimensional fabricating models by simple processing.

BRIEF DESCRIPTION OF DRAWINGS

FIG. 5 is a table showing the structure of an arrangement control algorithm table according to the second embodiment of the present invention;

FIG. 6A is a table showing the structure of an arrangement control parameter table according to the second embodiment of the present invention;

FIG. 6B is a view showing a practical example of a virtual area for laminating and fabricating according to the second embodiment of the present invention;

FIG. 6C is a table showing practical examples of arrangement control parameters in the virtual area for laminating and fabricating according to the second embodiment of the present invention;

FIG. 6E is a table showing other practical examples of arrangement control parameters in the virtual area for laminating and fabricating according to the second embodiment of the present invention;

FIG. 7 is a table showing the structure of a three-dimensional fabricating model file according to the second embodiment of the present invention;

FIG. 10 is a table showing the structure of a combination search table according to the second embodiment of the present invention;

FIG. 11 is a flowchart illustrating the procedure of three-dimensional fabricating model arrangement processing by the information processing apparatus according to the second embodiment of the present invention;

FIG. 14 is a table showing the structure of a three-dimensional grid aggregate model generation table according to the third embodiment of the present invention;

FIG. 18 is a table showing the structure of a combination search table according to the fourth embodiment of the present invention;

FIG. 19 is a flowchart illustrating the procedure of three-dimensional fabricating model arrangement processing by the information processing apparatus according to the second embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

An information processing apparatus 100 according to the first embodiment of the present invention will be described with reference to FIG. 1. The information processing apparatus 100 is an apparatus that arranges three-dimensional fabricating models.

Figure 1:
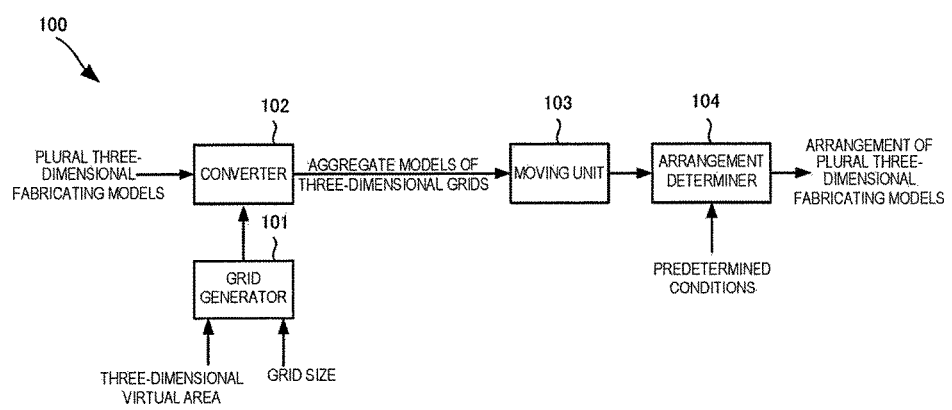
FIG. 1 is a block diagram showing the arrangement of an information processing apparatus according to the first embodiment of the present invention.

As shown in FIG. 1, the information processing apparatus 100 includes a grid generator 101, a converter 102, a moving unit 103, and an arrangement determiner 104. The grid generator 101 generates three-dimensional grids by dividing a three-dimensional virtual area by a predetermined size. The converter 102 converts a plurality of three-dimensional fabricating models into aggregate models of the three-dimensional grids respectively including the three-dimensional fabricating models. The moving unit 103 relatively moves the aggregate models not to overlap each other. If the arrangement of the aggregate models satisfies predetermined conditions, the arrangement determiner 104 determines the arrangement of the aggregate models as the arrangement of the plurality of three-dimensional fabricating models.

According to this embodiment, it is possible to efficiently combine and arrange a plurality of three-dimensional fabricating models by simple processing since the three-dimensional fabricating models are arranged based on three-dimensional grid aggregate models respectively including the three-dimensional fabricating models.

[Second Embodiment]

A three-dimensional fabricating model arrangement in an information processing apparatus according to the second embodiment of the present invention will be described next. In the three-dimensional fabricating model arrangement according to this embodiment, three-dimensional fabricating models are converted into aggregate models of grids as cubes having a predetermined size, and the aggregate models are moved not to overlap each other, thereby generating an efficient combined arrangement of the three-dimensional fabricating models in laminating and fabricating processing.

<<Operation Overview of Three-Dimensional Fabricating Model Arrangement>>

Figure 2:
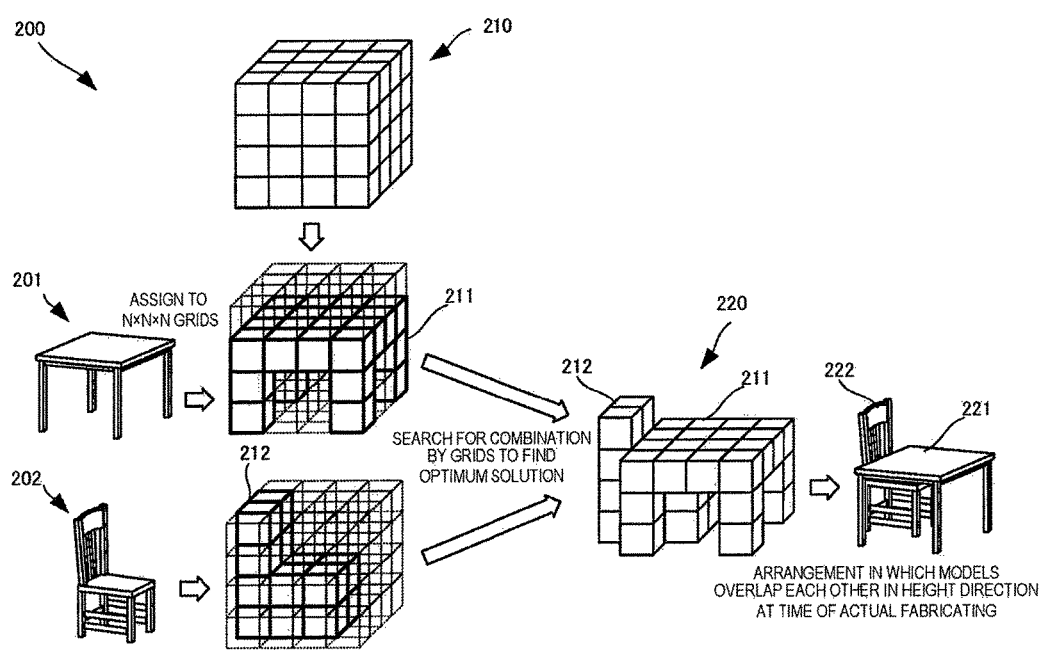
FIG. 2 is a view showing an operation overview of a three-dimensional fabricating model arrangement according to the second embodiment of the present invention.

FIG. 2 is a view showing an operation overview of a three-dimensional fabricating model arrangement 200 according to this embodiment. FIG. 2 shows processing of searching for an appropriate arrangement from two three-dimensional fabricating models of a desk and chair. The appropriate arrangement indicates an arrangement for efficiently implementing laminating and fabricating. For example, the appropriate arrangement is an arrangement in which the size in a laminating direction (Z direction) is small and the three-dimensional fabricating models can be fabricated densely to have a small space therebetween. This appropriate arrangement can decrease the amount of laminating material and shorten the fabricating time.

Referring to FIG. 2, a grid aggregate 210 of N×N×N is prepared to express a three-dimensional fabricating model by an aggregate of three-dimensional grids. Each grid is a cube having a predetermined size. The predetermined size is a size that can include constituent parts of the three-dimensional fabricating model and maintain a necessary distance or more to each constituent part of another three-dimensional fabricating model in laminating and fabricating processing.

A desk 201 and a chair 202 are converted into an aggregate model 211 of the desk and an aggregate model 212 of the chair, respectively, so that cubic grids include three-dimensional fabricating models. The aggregate model 211 of the desk and the aggregate model 212 of the chair are initially arranged in a virtual area for laminating and fabricating. After that, the aggregate models 211 and 212 undergo relative moving processing according to a predetermined algorithm, thereby deciding a final arrangement 220 under conditions that the size in the laminating direction (Z direction) is small and the three-dimensional fabricating models can be fabricated densely to have a small space therebetween.

The three-dimensional fabricating model data of the desk 201 and the chair 202 included in the aggregate models 211 and 212 of the final arrangement 220 are supplied to a three-dimensional fabricating apparatus, thereby simultaneously laminating and fabricating a desk 221 and a chair 222. In this way, it is possible to fabricate the desk 221 and the chair 222 densely to have a small space and to be small in size in the laminating direction, thereby decreasing the amount of laminating material and shortening the fabricating time.

<<Functional Arrangement of Three-Dimensional Fabricating System>>

Figure 3:
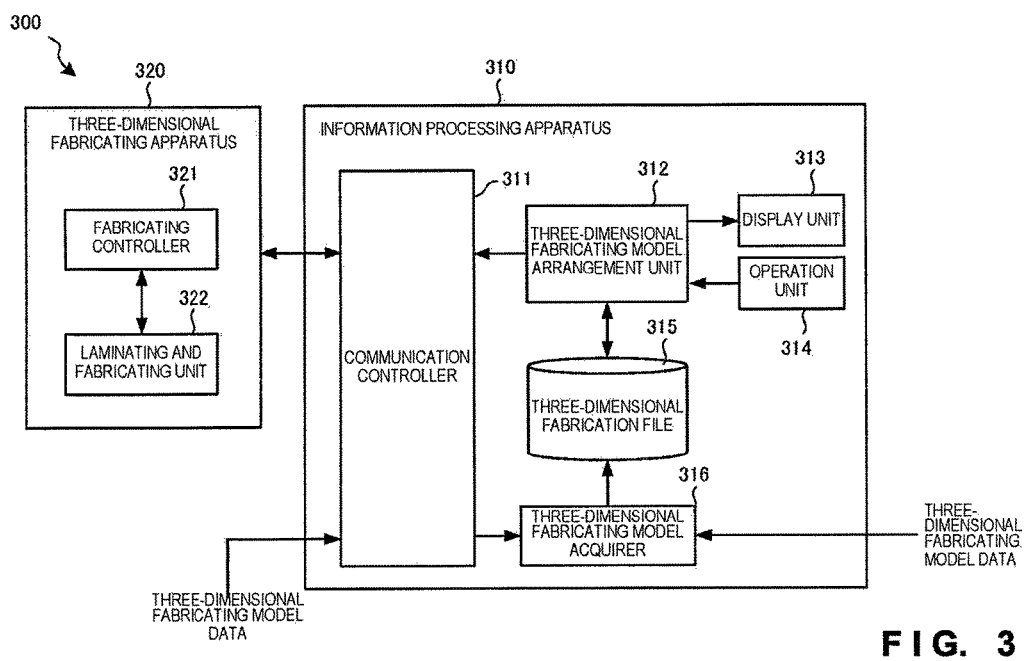
FIG. 3 is a block diagram showing the functional arrangement of a three-dimensional fabricating system according to the second embodiment of the present invention.

FIG. 3 is a block diagram showing the functional arrangement of a three-dimensional fabricating system 300 according to this embodiment.

The three-dimensional fabricating system 300 includes an information processing apparatus 310 for arranging three-dimensional fabricating models of this embodiment, and a three-dimensional fabricating apparatus 320 that laminates and fabricates three-dimensional fabricated objects based on data including the arrangement of three-dimensional fabricating models from the information processing apparatus 310. Note that although not shown, the three-dimensional fabricating system 300 includes a model generation apparatus that generates a three-dimensional fabricating model from data of a three-dimensional fabricated object. The model generation apparatus may be included in the information processing apparatus 310.

The information processing apparatus 310 may be a general-purpose computer such as a PC (Personal Computer). The information processing apparatus 310 includes a communication controller 311, a three-dimensional fabricating model arrangement unit 312, a display unit 313, an operation unit 314, a three-dimensional fabrication file 315, and a three-dimensional fabricating model acquirer 316. Note that if the information processing apparatus 310 has a function of generating a three-dimensional fabricating model, the three-dimensional fabricating model acquirer 316 serves as a three-dimensional fabricating model generator.

The communication controller 311 controls communication with the three-dimensional fabricating apparatus 320 or the model generation apparatus as an external apparatus. The three-dimensional fabricating model arrangement unit 312 arranges three-dimensional fabricating models in a virtual area for laminating and fabricating by using data stored in the three-dimensional fabrication file 315 in accordance with an input or operation performed by an operator via the operation unit 314 according to an operation instruction displayed on the display unit 313. The display unit 313 sends the status of the information processing apparatus 310 and requests the operator to input parameters necessary to arrange the three-dimensional fabricating models. The operation unit 314 includes a keyboard, a pointing device, and a touch panel, and accepts an input or operation instruction from the operator according to an instruction displayed on the display unit 313. The three-dimensional fabrication file 315 stores data of the three-dimensional fabricating models, an arrangement algorithm, arrangement parameters, and the like which are data used by the three-dimensional fabricating model arrangement unit 312 to arrange the three-dimensional fabricating models. The three-dimensional fabricating model acquirer 316 acquires, via the communication controller 311 or via an I/O interface from a storage medium or the like, the three-dimensional fabricating models provided by the model generation apparatus.

The three-dimensional fabricating apparatus 320 is a so-called 3D printer, and includes a fabricating controller 321 and a laminating and fabricating unit 322. The fabricating controller 321 controls processing of fabricating three-dimensional fabricated objects in the laminating and fabricating unit 322 in accordance with the data of the three-dimensional fabricating models including the arrangement data received from the information processing apparatus 310. For example, the fabricating controller 321 executes material providing control, laminating width control, material curing control, and the like according to each laminating pattern. The laminating and fabricating unit 322 laminates and fabricates three-dimensional fabricated objects based on the fabricating method of the three-dimensional fabricating apparatus 320 according to the fabricating controller 321.

<<Functional Arrangement of Three-Dimensional Fabricating Model Arrangement Unit>>

Figure 4:
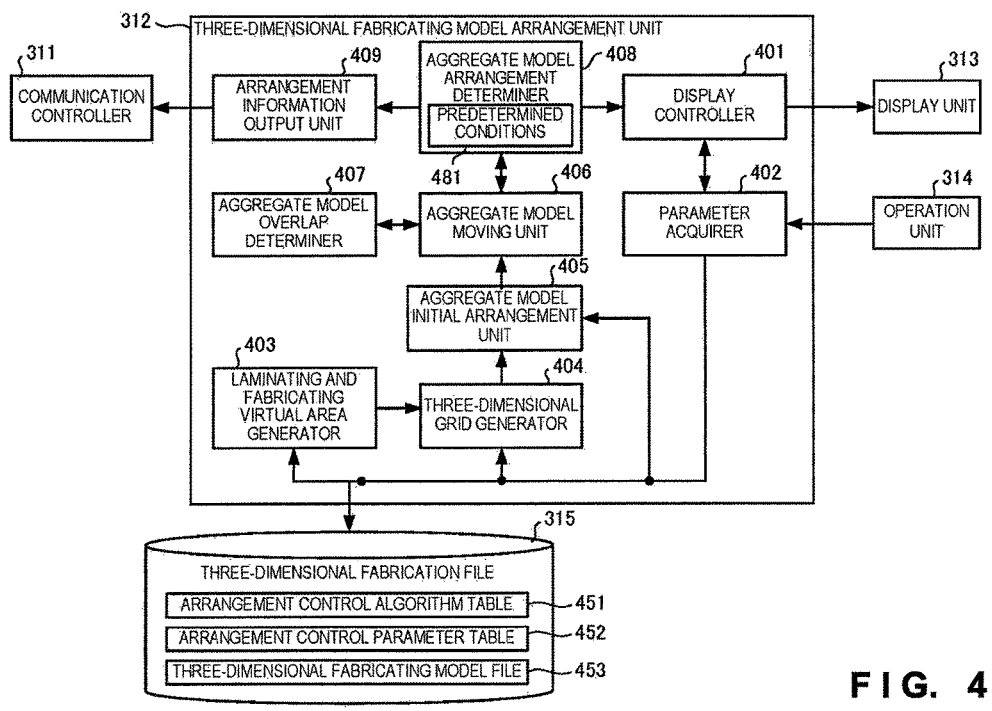
FIG. 4 is a block diagram showing the functional arrangement of a three-dimensional fabricating model arrangement unit according to the second embodiment of the present invention.

FIG. 4 is a block diagram showing the functional arrangement of the three-dimensional fabricating model arrangement unit 312 of the information processing apparatus 310 according to this embodiment. Note that FIG. 4 shows not all connection lines to functional components that use the data of the three-dimensional fabrication file 315. FIG. 4 also shows functional components connected to the three-dimensional fabricating model arrangement unit 312.

The three-dimensional fabricating model arrangement unit 312 includes a display controller 401, a parameter acquirer 402, a laminating and fabricating virtual area generator 403, a three-dimensional grid generator 404, an aggregate model initial arrangement unit 405, an aggregate model moving unit 406, an aggregate model overlap determiner 407, an aggregate model arrangement determiner 408, and an arrangement information output unit 409. The three-dimensional fabrication file 315 connected to the three-dimensional fabricating model arrangement unit 312 includes an arrangement control algorithm table 451, an arrangement control parameter table 452, and a three-dimensional fabricating model file 453.

The display controller 401 displays the arrangement state of the three-dimensional fabricating models and an operator instruction on the display unit 313. The parameter acquirer 402 acquires parameters necessary to arrange the three-dimensional fabricating models input by the operator via the operation unit 314. The parameters include, for example, an arrangement target position of the three-dimensional fabricating models in a virtual area, a threshold for determining completion of an arrangement, and the number of processes. In addition, a grid shape, a grid size, a moving size, a rotation disable direction, and the like may be set by the operator.

The laminating and fabricating virtual area generator 403 generates a virtual area for laminating and fabricating as a target region where the three-dimensional fabricating models are arranged in correspondence with the laminating and fabricating unit 322 of the three-dimensional fabricating apparatus 320 stored in the arrangement control parameter table 452 of the three-dimensional fabrication file 315. The virtual area is desirably divided into virtual grids having the same size as that of the three-dimensional grids including the three-dimensional fabricating models. The three-dimensional grid generator 404 generates three-dimensional grids to include the three-dimensional fabricating models falling within the virtual area by using arrangement control parameters stored in the arrangement control parameter table 452 in accordance with an algorithm stored in the arrangement control algorithm table 451.

In accordance with the arrangement control parameters stored in the arrangement control parameter table 452, the aggregate model initial arrangement unit 405 initially arranges three-dimensional grid aggregate models including the plurality of three-dimensional fabricating models to be combined and arranged. For example, the initial arrangement is set in the periphery of the virtual area and the aggregate models are moved by setting the center of the virtual area as a target position or the initial arrangement is set at the center of the virtual area and the aggregate models are moved toward the periphery of the virtual area. The aggregate model moving unit 406 moves the three-dimensional grid aggregate models of the plurality of three-dimensional fabricating models from the initial arrangement on a grid basis by using the arrangement control parameters stored in the arrangement control parameter table 452 in accordance with the algorithm stored in the arrangement control algorithm table 451. The aggregate model overlap determiner 407 determines whether the three-dimensional grid aggregate models of the plurality of three-dimensional fabricating models overlap each other due to temporary movement by the aggregate model moving unit 406. If the aggregate model overlap determiner 407 determines that the aggregate models overlap each other, the aggregate model moving unit 406 stops temporary movement, and selects another movement to repeat temporary movement.

The aggregate model arrangement determiner 408 has predetermined conditions 481 for determining the end of the appropriate arrangement of the three-dimensional grid aggregate models of the three-dimensional fabricating models, and determines, as an appropriate arrangement, an arrangement when the sum of distances of the three-dimensional grid aggregate models from the target position is equal to or smaller than a threshold, an arrangement when moving processing is performed a predetermined number of times, or the like. If the aggregate model arrangement determiner 408 determines an appropriate arrangement, the arrangement information output unit 409 outputs data of the three-dimensional fabricating models including the arrangement data to the three-dimensional fabricating apparatus 320 via the communication controller 311.

(Arrangement Control Algorithm Table)

FIG. 5 is a table showing the structure of the arrangement control algorithm table 451 according to this embodiment. The arrangement control algorithm table 451 stores a control algorithm for arranging three-dimensional fabricating models in a virtual area according to this embodiment. Note that the structure of the arrangement control algorithm table 451 is not limited to that shown in FIG. 5.

The arrangement control algorithm table 451 stores an arrangement processing condition 502 and an arrangement control program 503 in association with an arrangement control algorithm ID 501. The arrangement processing condition 502 includes arrangement accuracy, an arrangement speed, the number of three-dimensional fabricating models, and a three-dimensional fabricating apparatus (3D printer) to be used. In this embodiment, an overview of an arrangement control algorithm is processing of generating three-dimensional grid aggregate models including three-dimensional fabricating models and repeating movement of the three-dimensional grid aggregate models on a grid basis. The appropriate arrangement control program 503 is stored in correspondence with the arrangement processing condition 502.

(Arrangement Control Parameter Table)

FIG. 6A is a table showing the structure of the arrangement control parameter table 452 according to this embodiment. The arrangement control parameter table 452 stores parameters to be used by the arrangement control program 503. The parameters include parameters automatically set in correspondence with the three-dimensional fabricating apparatus 320 to be used and the like, and parameters set by the operator using the operation unit 314.

The arrangement control parameter table 452 stores a laminating and fabricating virtual area 612, final arrangement target position information 613, initial arrangement position information 614, grid size information 615, and control information 616 of the moving distances and moving directions of generated aggregate models in association with a fabricating model ID 611 as an arrangement control target. The arrangement control parameter table 452 also stores a rotation enable/disable flag 617 indicating whether to permit rotation, and the predetermined conditions 481 for determining whether an appropriate arrangement has been reached. In this embodiment, the predetermined conditions 481 include the threshold of the sum of distances from the target position, and the number of times of execution of moving processing.

The control information 616 of the moving distances and moving directions of the generated aggregate models includes X-axis direction information 661, Y-axis direction information 662, and Z-axis direction information 663. Each piece of information includes a moving distance in grids (In this example, one grid is set but the present invention is not limited to this.

The moving distance may be selected based on the speed and accuracy of convergence to the proper arrangement.), the priority level of movement toward the center, and the priority level of movement toward the periphery.

(Practical Examples of Arrangement Control Parameters)

A practical example of the arrangement control parameter table 452 shown in FIG. 6A will be described with reference to FIGS. 6B to 6E. FIGS. 6B and 6C show parameters for setting the priority levels of the moving directions of the three-dimensional grid aggregate areas in eight divided regions by setting the center of the XY plane of the virtual area as a target position. FIGS. 6D and 6E show parameters for setting the priority levels of the moving directions of the three-dimensional grid aggregate areas in 26 divided regions by setting the center of the virtual area (X, Y, Z) as a target position. Referring to FIG. 6D, the center of the virtual area is set as a target position. However, the underside of the three-dimensional fabricate is desirably set as the initial target position of the three-dimensional fabricating models. Note that weighting of the arrangement control parameters is not limited to the division examples or parameter examples shown in FIGS. 6B to 6E. For example, in FIGS. 6B to 6E, movement by one grid includes diagonal movement. However, the moving unit need not be one grid, and a simple arrangement in which movement in one priority direction is repeated by excluding diagonal movement and movement synchronization is easy may be adopted.

FIG. 6B is a view showing a practical example of the virtual area for laminating and fabricating according to this embodiment.

A target position 621 is set at the center of the XY plane of a virtual area 620 for laminating and fabricating. The XY plane is divided into eight regions (a) to (h).

FIG. 6C is a table showing practical examples of the arrangement control parameters in the virtual area 620 for laminating and fabricating of FIG. 6B according to this embodiment. FIG. 6C shows a moving direction priority 630 in the X and Y directions in the virtual area 620 for laminating and fabricating, and Z direction moving control and rotation control 640 in the virtual area 620 for laminating and fabricating.

The moving direction priority 630 in the X and Y directions stores moving directions 632 in order of priority in the current region of the aggregate model in accordance with priority levels 631 of "1" (highest) to "8" (lowest). Note that (x, y) indicates a moving grid count in the X-axis direction and that in the Y-axis direction, "1" indicates movement by one grid in the positive direction along each axis, "−1" indicates movement by one grid in the negative direction along each axis, and "0" indicates no movement in each axis direction. If x and y are not "0", diagonal movement is indicated. In this embodiment, temporary movement is first performed in the direction of the priority level "1" (highest). If a collision occurs (models overlap each other due to temporary movement), temporary movement is performed in the direction of the second highest priority level. According to the moving direction priority 630 in the X and Y directions, the aggregate models move toward the central target position 621 as much as possible.

The Z direction moving control and rotation control 640 stores permitted processing 642 and prohibited processing 643 in association with each moving processing 641. For example, in movement in the Z direction, when "z" represents the current position of the aggregate model in the Z-axis direction, movement of "−z" is attempted. If such movement is impossible, movement of "−(z−1)", . . . , movement of 0 are sequentially attempted. In horizontal rotation and vertical rotation, when "Ph" and "Pv" represent the probabilities of the rotations, rotations of −90° and +90° are randomly attempted. Note that in the practical examples shown in FIG. 6C, permitted processing, prohibited processing, Ph, and Pv are assumed to be explicitly instructed by the operator but may be automatically set by the information processing apparatus 310.

Figure 6D:
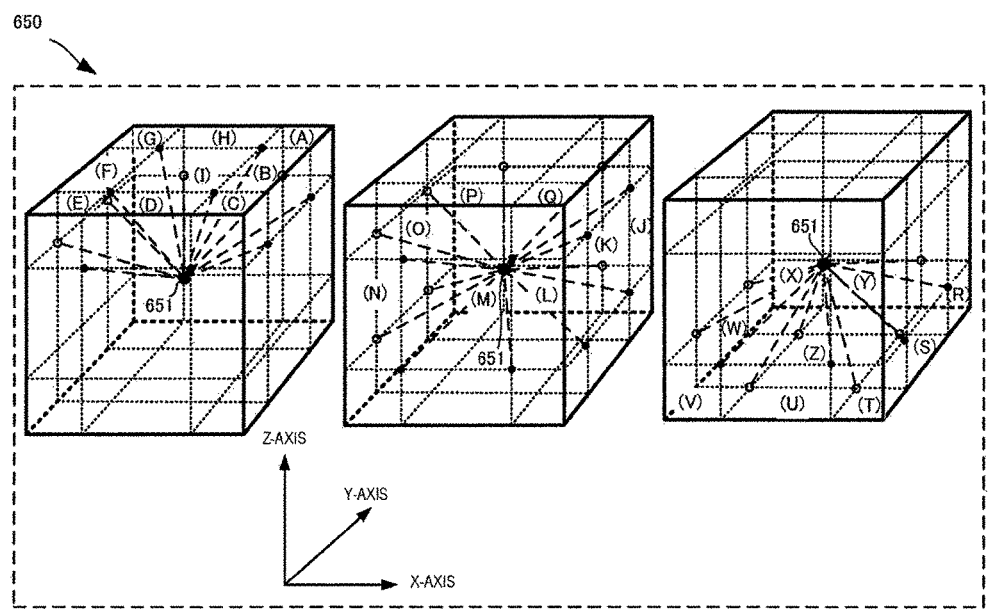
FIG. 6D is a view showing another example of the virtual area for laminating and fabricating according to the second embodiment of the present invention.

FIG. 6D is a view showing another practical example of the virtual area for laminating and fabricating according to this embodiment.

A target position 651 is set at the center of a virtual area 650 for laminating and fabricating. An XYZ three-dimensional fabricate is divided in eight peripheral directions, upper direction, and lower direction with respect to the target position 651 to obtain 18 (=2×9) regions (A) to (Z). Note that to avoid complexity, in FIG. 6D, the left view shows the nine regions (A) to (I) in the upper direction, the middle view shows the eight peripheral regions (J) to (Q), and the right view shows the nine regions (R) to (Z) in the lower direction. In FIG. 6D, solid circles and open circles indicate intersections closest to corners when each outer surface of the virtual area 650 is divided into 16 regions, and straight lines to the respective intersections from the target position 651 serve as the division lines of the regions. The solid circles represent intersections on visible surfaces in the perspective view of the virtual area 650, and the open circles represent intersections on invisible surfaces in the perspective view of the virtual area 650. Division shown in FIG. 6D is merely an example, and the present invention is not limited to this.

FIG. 6E is a table showing other practical examples of the arrangement control parameters in the virtual area for laminating and fabricating according to this embodiment. FIG. 6E shows a moving direction priority 660 in the X, Y, and Z directions in the virtual area 650 for laminating and fabricating.

The moving direction priority 660 in the X, Y, and Z directions stores moving directions 662 in order of priority in the current region of the aggregate model in accordance with priority levels 661 of "1" (highest) to "26" (lowest). Note that (x, y, z) indicates a moving grid count in the X-axis direction, that in the Y-axis direction, and that in the Z-axis direction, "1" indicates movement by one grid in the positive direction along each axis, "−1" indicates movement by one grid in the negative direction along each axis, and "0" indicates no movement in each axis direction. If at least two of x, y, and z are not "0", diagonal movement is indicated. In this embodiment, temporary movement is first performed in the direction of the priority level "1" (highest). If a collision occurs (models overlap each other due to temporary movement), temporary movement is performed in the direction of the second highest priority level. According to the moving direction priority 660 in the X, Y, and Z directions, the aggregate model moves toward the central target position 661 as much as possible.

For example, movement in the lower direction along the Z-axis is prioritized in the regions (A) to (I), maintaining in the Z-axis direction is prioritized in the regions (J) to (Q), and movement in the upper direction along the Z-axis is prioritized in the regions (R) to (Z). The region (I) is a region immediately above the target position, and the region (Z) is a region immediately below the target position.

Note that in terms of the fabricating speed and material consumption, the three-dimensional fabricating models are desirably arranged from the lower layer of the fabricating area of the laminating and fabricating unit 322, and thus the initial target position of the three-dimensional fabricating models is desirably set to the underside of the three-dimensional fabricated object.

(Three-Dimensional Fabricating Model File)

FIG. 7 is a table showing the structure of the three-dimensional fabricating model file 453 according to this embodiment. The three-dimensional fabricating model file 453 stores the data of the three-dimensional fabricating models acquired by the three-dimensional fabricating model acquirer 316.

The three-dimensional fabricating model file 453 stores a data format 702 expressing a three-dimensional fabricating model, a laminating width range 703, and three-dimensional fabricating model data 704 expressed in the data format 702 in association with a three-dimensional fabricating model ID 701. Note that examples of the data format 702 are STL (Standard Triangulated Language) and DXF (Drawing Exchange Format) but the present invention is not limited to them. In processing according to this embodiment, the STL format is used, and conversion is performed for other data formats.

(Hardware Arrangement of Information Processing Apparatus>>

Figure 8:
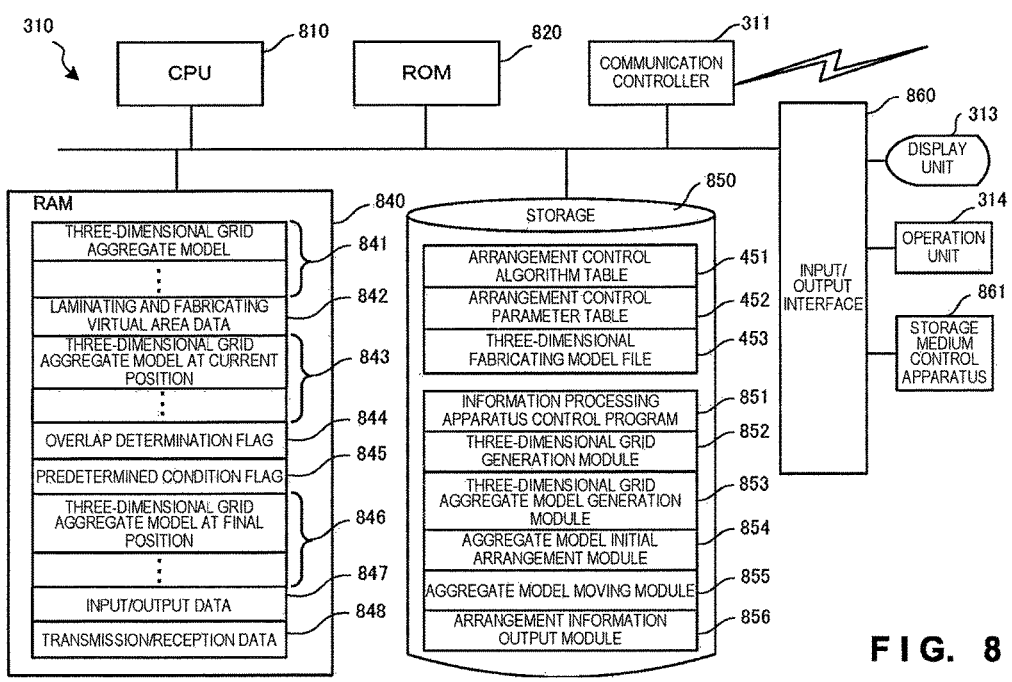
FIG. 8 is a block diagram showing the hardware arrangement of an information processing apparatus according to the second embodiment of the present invention.

FIG. 8 is a block diagram showing the hardware arrangement of the information processing apparatus 310 according to this embodiment. Referring to FIG. 8, a CPU (Central Processing Unit) 810 is a calculation control processor, and implements the functional components of the information processing apparatus 310 shown in FIG. 3 by executing a program. A ROM (Read Only Memory) 820 stores permanent data such as initial data and programs. The communication controller 311 communicates with another communication terminal and each server via a network. Note that the number of the CPU 810 is not limited to one. A plurality of CPUs may be included or the CPU 810 may include a GPU (Graphics Processing Unit) for image processing. The communication controller 311 desirably includes a CPU independent of the CPU 810 and writes or reads out transmission/reception data in or from an area of a RAM (Random Access Memory) 840. In addition, a DMAC (Direct Memory Access Control) for transferring data between the RAM 840 and a storage 850 is desirably provided (not shown). An input/output interface 860 desirably includes a CPU independent of the CPU 810, and writes or reads out input/output data in or from the area of the RAM 840. Therefore, the CPU 810 processes the data by recognizing that the data has been received or transferred to the RAM 840. Furthermore, the CPU 810 prepares a processing result in the RAM 840, and delegates succeeding transmission or transfer to the communication controller 311, DMAC, or input/output interface 860.

The RAM 840 is a random access memory used as a temporary storage work area by the CPU 810. In the RAM 840, areas for storing data necessary to implement the embodiment are reserved. Three-dimensional grid aggregate models 841 are data converted into grid aggregates the number of which is equal to that of three-dimensional fabricating models. A laminating and fabricating virtual area data 842 is data of the virtual area representing the fabricating area of the laminating and fabricating unit 322 of the three-dimensional fabricating apparatus 320. Three-dimensional grid aggregate models 843 at the current positions are current data after moving each three-dimensional grid aggregate model. An overlap determination flag 844 is a flag indicating a result of determining overlapping with another three-dimensional grid aggregate model when temporarily moving each three-dimensional grid aggregate model. A predetermined condition flag 845 is a flag indicating a result of determining whether the arrangement of the plurality of three-dimensional grid aggregate models satisfies predetermined conditions. Three-dimensional grid aggregate models 846 at the final positions are data of the three-dimensional grid aggregate models when the predetermined condition flag 845 indicates that the predetermined conditions are satisfied. Input/output data 847 is data input/output via the input/output interface 860. Transmission/reception data 848 is data transmitted/received via the communication controller 311.

The storage 850 stores a database and various parameters or the following data or programs necessary to implement the embodiment. The arrangement control algorithm table 451 stores an algorithm according to arrangement processing conditions. The arrangement control parameter table 452 stores parameters to be used by an arrangement control algorithm. The three-dimensional fabricating model file 453 stores data of the three-dimensional fabricating models, the arrangement of which is controlled.

The storage 850 stores the following programs. An information processing apparatus control program 851 is a control program for controlling the overall information processing apparatus 310. A three-dimensional grid generation module 852 is a module for generating three-dimensional grids for generating three-dimensional grid aggregate models from three-dimensional fabricating models. A three-dimensional grid aggregate model generation module 853 is a module for generating three-dimensional grid aggregate models including three-dimensional fabricating models from the three-dimensional fabricating models. An aggregate model initial arrangement module 854 is a module for initially arranging the aggregate models according to the arrangement control algorithm of the three-dimensional grid aggregate models. An aggregate model moving module 855 is a module for controlling movement of the plurality of three-dimensional grid aggregate models. An arrangement information output module 856 is a module for determining whether the result of moving the plurality of three-dimensional grid aggregate models satisfies the predetermined conditions, and outputting information of the arrangement result when the predetermined conditions are satisfied.

The input/output interface 860 interfaces input/output data with an input/output device. The display unit 313 and the operation unit 314 are connected to the input/output interface 860. A storage medium control apparatus 861 is also connected.

Note that in the RAM 840 and storage 850 shown in FIG. 8, no programs or data associated with the general-purpose functions of the information processing apparatus 310 and other feasible functions are shown.

(Three-Dimensional Grid Aggregate Model Generation Table)

Figure 9:
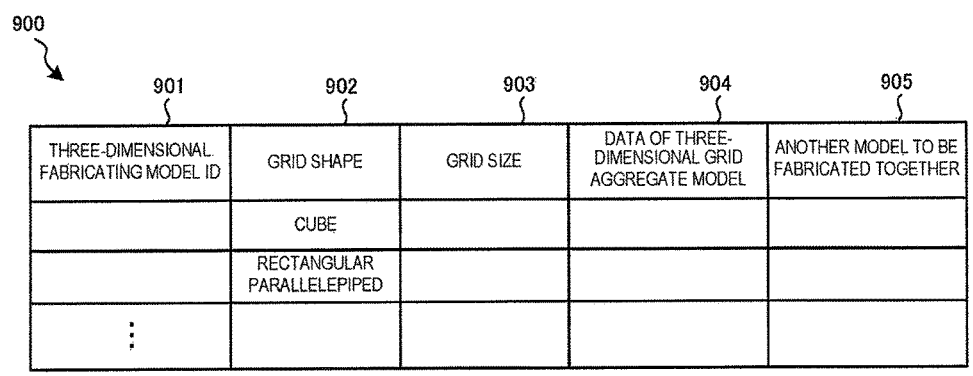
FIG. 9 is a table showing the structure of a three-dimensional grid aggregate model generation table according to the second embodiment of the present invention.

FIG. 9 is a table showing the structure of a three-dimensional grid aggregate model generation table 900 according to this embodiment. The three-dimensional grid aggregate model generation table 900 is generated in the RAM 840 shown in FIG. 8, and used to generate three-dimensional grid aggregate models from three-dimensional fabricating models.

The three-dimensional grid aggregate model generation table 900 stores a three-dimensional grid shape 902, a three-dimensional grid size 903, and data 904 of a generated three-dimensional grid aggregate model in association with a three-dimensional fabricating model ID 901. In addition, to indicate the relationship between three-dimensional fabricating models to be fabricated together, the table stores another model 905 to be fabricated together.

(Combination Search Table)

FIG. 10 is a table showing the structure of a combination search table 1000 according to this embodiment. The combination search table 1000 is generated in the RAM 840 shown in FIG. 8 to include the data shown in FIG. 8, and used to search for an appropriate combined arrangement of a plurality of three-dimensional grid aggregate models.

The combination search table 1000 stores an overlap determination result 1003 after temporary movement, and a predetermined condition flag 1004 indicating an appropriate arrangement obtained upon the end of movement in association with a first aggregate model 1001 to an nth aggregate model 1002 corresponding to a plurality of three-dimensional grid aggregate models. Each of the first aggregate model 1001 to the nth aggregate model 1002 stores model data before movement, a moving direction, and model data after movement. As for the moving direction, for example, the moving direction shown in FIG. 6C is stored.

<<Three-Dimensional Fabricating Model Arrangement Processing by Information Processing Apparatus>>

FIG. 11 is a flowchart illustrating the procedure of three-dimensional fabricating model arrangement processing by the information processing apparatus 310 according to this embodiment. This flowchart is executed by the CPU 810 shown in FIG. 8 by using the RAM 840, thereby implementing the functional component, especially, the three-dimensional fabricating model arrangement unit 312 of the information processing apparatus 310 shown in FIG. 3.

In step S1101, the information processing apparatus 310 replaces each three-dimensional fabricating model by a three-dimensional grid aggregate model of N×N×N (grid model generation processing). In step S1103, the information processing apparatus 310 initially arranges all the three-dimensional grid aggregate models to be fabricated together in the virtual areal (fabricating area) for laminating and fabricating.

In step S1105, the information processing apparatus 310 temporarily moves each three-dimensional grid aggregate model on a grid basis. Moving directions are weighted to move the models in the fabricating area to a desired location. For example, the priority levels shown in FIG. 6C are used. In step S1107, if temporary movement results in a collision (overlapping) with another three-dimensional grid aggregate model, the information processing apparatus 310 cancels the temporary movement and reattempts temporary movement in another moving direction. Steps S1105 and S1107 will be referred to as "combination search processing" hereinafter.

Upon completion of movement of all the models, the information processing apparatus 310 calculates distances from the target position, and obtains an evaluation value in step S1109. In step S1111, if the evaluation value is best so far, the information processing apparatus 310 saves the position information. In step S1113, the information processing apparatus 310 repeats the processing until the evaluation value satisfies a set condition or the processing is executed a designated number of times.

(Grid Model Generation Processing)

Figure 12A:
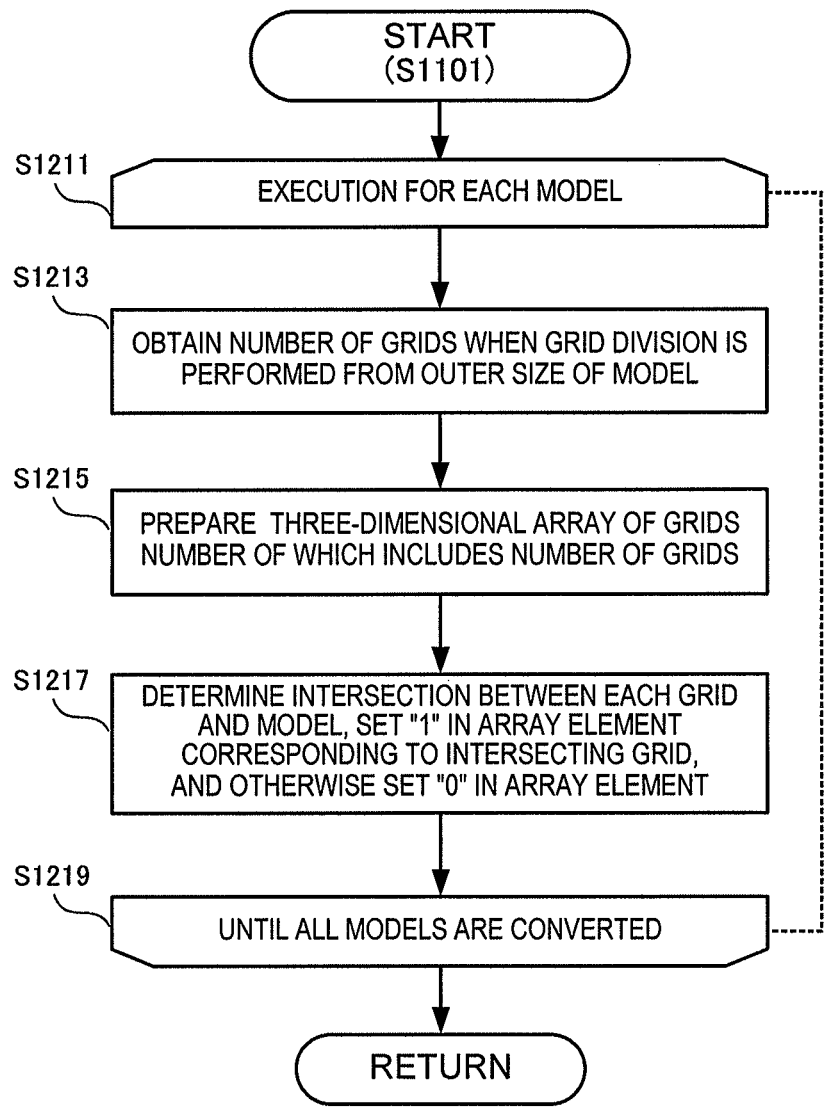
FIG. 12A is a flowchart illustrating the procedure of replacement processing according to the second embodiment of the present invention.

FIG. 12A is a flowchart illustrating the procedure of the grid model generation processing (S1101) according to this embodiment.

In steps S1211 to S1219, the information processing apparatus 310 repeats processes in steps S1213 to S1217 for all the three-dimensional fabricating models. In step S1213, the information processing apparatus 310 obtains the number of grids when grid division is performed from the outer size of the three-dimensional fabricating model to cubes as three-dimensional grids. In step S1215, the information processing apparatus 310 prepares a three-dimensional array of grids the number of which is equal to that of grids. In step S1217, the information processing apparatus 310 determines an intersection between each grid and the three-dimensional fabricating model, "1" is set in the three-dimensional grid of an array element corresponding to an intersecting grid, and otherwise "0" is set in the remaining three-dimensional grids. As a result, an aggregate model is generated by the three-dimensional grids in which "1" has been set.

(Combination Search Processing)

Figure 12B:
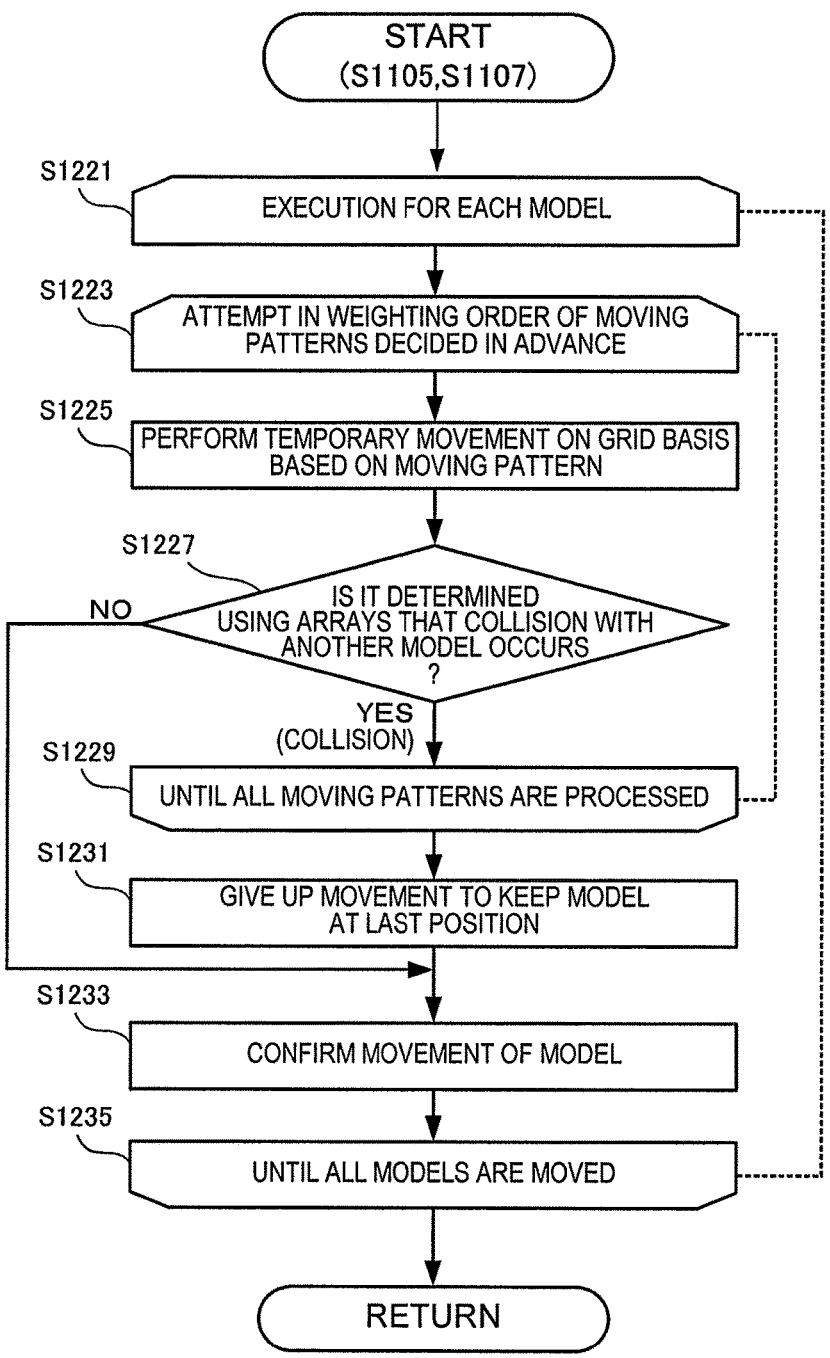
FIG. 12B is a flowchart illustrating the procedure of combination search processing according to the second embodiment of the present invention.

FIG. 12B is a flowchart illustrating the procedure of the combination search processing (S1105 and S1107) according to this embodiment.

In steps S1221 to S1235, the information processing apparatus 310 repeats processes in steps S1223 to S1233 for all the three-dimensional fabricating models. In steps S1223 to S1229, the information processing apparatus 310 repeats the processes in steps S1225 and S1227 for each three-dimensional fabricating model until all moving patterns are processed according to the weights (priority levels) of the moving patterns (see FIG. 6C).

In step S1225, the information processing apparatus 310 temporarily moves the three-dimensional fabricating model on a grid basis based on a moving pattern. In step S1227, the information processing apparatus 310 determines whether the three-dimensional fabricating model collides against (overlaps) another three-dimensional grid aggregate model by using the arrays of three-dimensional grids. If a collision occurs, the temporary movement is canceled and movement in the direction of the next priority level is repeated; otherwise, the information processing apparatus 310 confirms movement of the three-dimensional grid aggregate model in step S1233.

Note that if a collision occurs, temporary movement is canceled to repeat movement in the direction of the next priority level, and then all the moving patterns are processed, the information processing apparatus 310 advances from step S1229 to S1231 to give up movement of the target three-dimensional grid aggregate model, thereby keeping it at the last position before latest movement.

Upon completion of movement of all the three-dimensional grid aggregate models, the process returns.

According to this embodiment, since an appropriate arrangement is searched for by converting each three-dimensional fabricating model into an aggregate model of cubic grids including the three-dimensional fabricating model, and moving it, it is possible to efficiently combine and arrange a plurality of three-dimensional fabricating models by simple processing.

[Third Embodiment]

A three-dimensional fabricating model arrangement in an information processing apparatus according to the third embodiment of the present invention will be described. The three-dimensional fabricating model arrangement according to this embodiment is different from that according to the second embodiment in that an accurate arrangement is implemented by simple processing by gradually reducing the size of cubic grids. The remaining components and operations are the same as those in the second embodiment. Thus, the same reference numerals denote the same components and operations and a detailed description thereof will be omitted.

<<Operation Overview of Three-Dimensional Fabricating Model Arrangement>>

Figure 13:
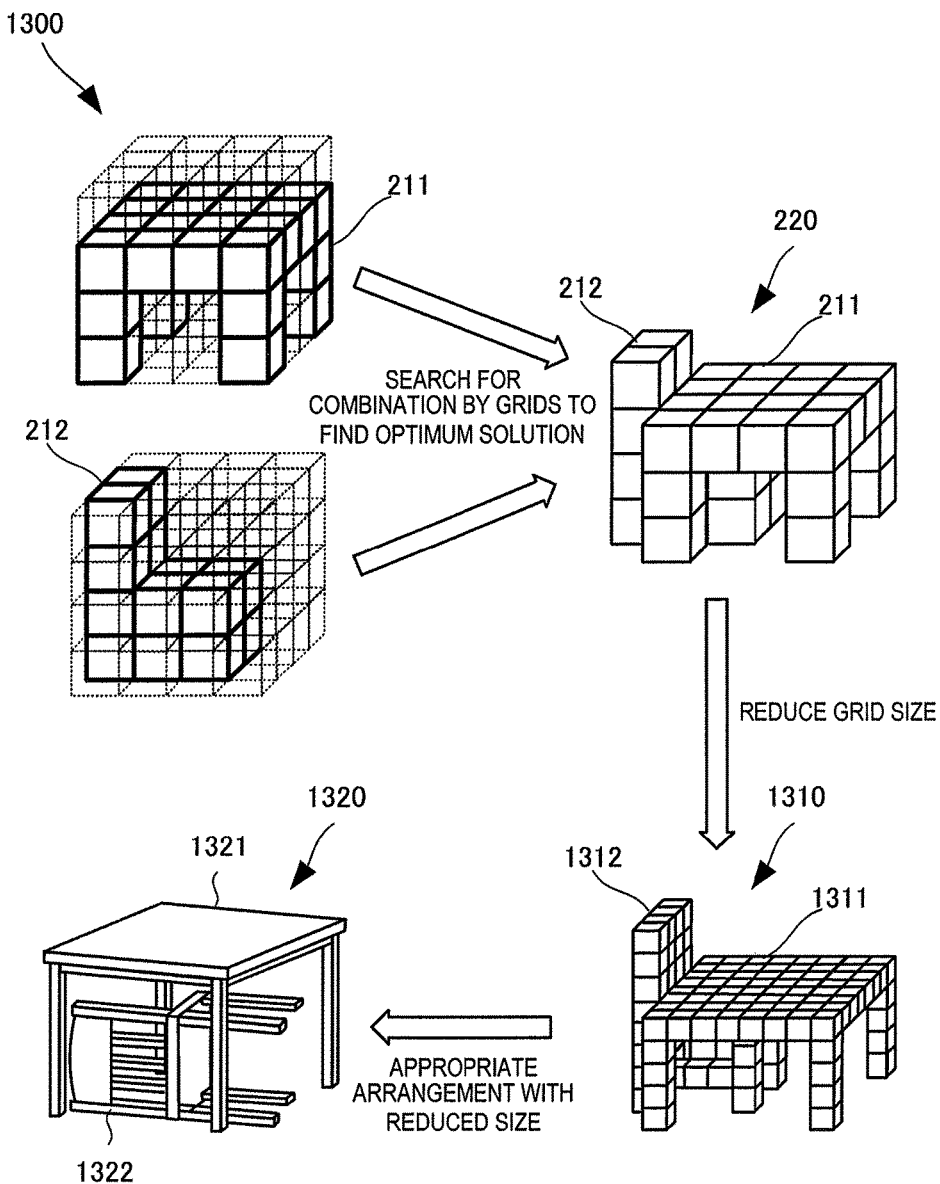
FIG. 13 is a view showing an operation overview of a three-dimensional fabricating model arrangement according to the third embodiment of the present invention.

FIG. 13 is a view showing an operation overview of a three-dimensional fabricating model arrangement 1300 according to this embodiment. Note that the same reference numerals as those in FIG. 2A denote the same elements in FIG. 13 and a description thereof will be omitted.

To implement a more appropriate arrangement, an arrangement 1310 with a reduced grid size is generated from a final arrangement 220 in which the three-dimensional grid aggregate models of a desk and chair are arranged according to the processing of the second embodiment. The arrangement 1310 shows an example in which a three-dimensional grid aggregate model 1311 of the desk and a three-dimensional grid aggregate model 1312 of the chair are generated by halving the grid size in the second embodiment. Similarly to the second embodiment, temporary movement and overlap determination are repeated to search for an appropriate combined arrangement based on the three-dimensional grid aggregate models 1311 and 1312.

In a final arrangement 1320 with a half size, for example, a three-dimensional fabricating model 1322 of the chair that cannot be arranged under the desk because the grids overlap each other in the final arrangement 220 can be arranged to be included in the outer shape of a three-dimensional fabricating model 1321 of the desk. In the final arrangement 1320 with the half size, the laminating height decreases to the height of the desk. Note that even if the chair cannot be arranged to be included in the outer shape of the desk by rotation unlike this example, the distance between the chair and the desk can be made close to a shortest distance which can implement laminating and fabricating processing.

As described above, by gradually reducing the grid size, initially implementing a schematic arrangement, and sequentially implementing a fine arrangement, it is possible to shorten the time taken to search for an appropriate combined arrangement, and also decrease the amount of laminating material by reducing the laminating volume to obtain a dense arrangement like the final arrangement 1320 with the half size and shorten the laminating time.

Note that reduction of the grid size is not limited to a half. The number of steps of reduction of the grid size to the smallest size corresponding to the shortest distance between three-dimensional fabricated objects is appropriately selected depending on the complexity of the shape of each three-dimensional fabricated object. In accordance with the number of steps, the initial grid size also changes.

(Three-Dimensional Grid Aggregate Model Generation Table)

FIG. 14 is a table showing the structure of a three-dimensional grid aggregate model generation table 1400 according to this embodiment. Note that the same reference numerals as those in FIG. 9 denote the same elements in FIG. 14 and a description thereof will be omitted.

The three-dimensional grid aggregate model generation table 1400 stores a first size 1403, . . . , an nth size 1404. The first size 1403 includes a grid size and data of a generated three-dimensional grid aggregate model. The nth size 1404 includes a grid size and data of a generated three-dimensional grid aggregate model.

<<Three-Dimensional Fabricating Model Arrangement Processing by Information Processing Apparatus>>

Figure 15:
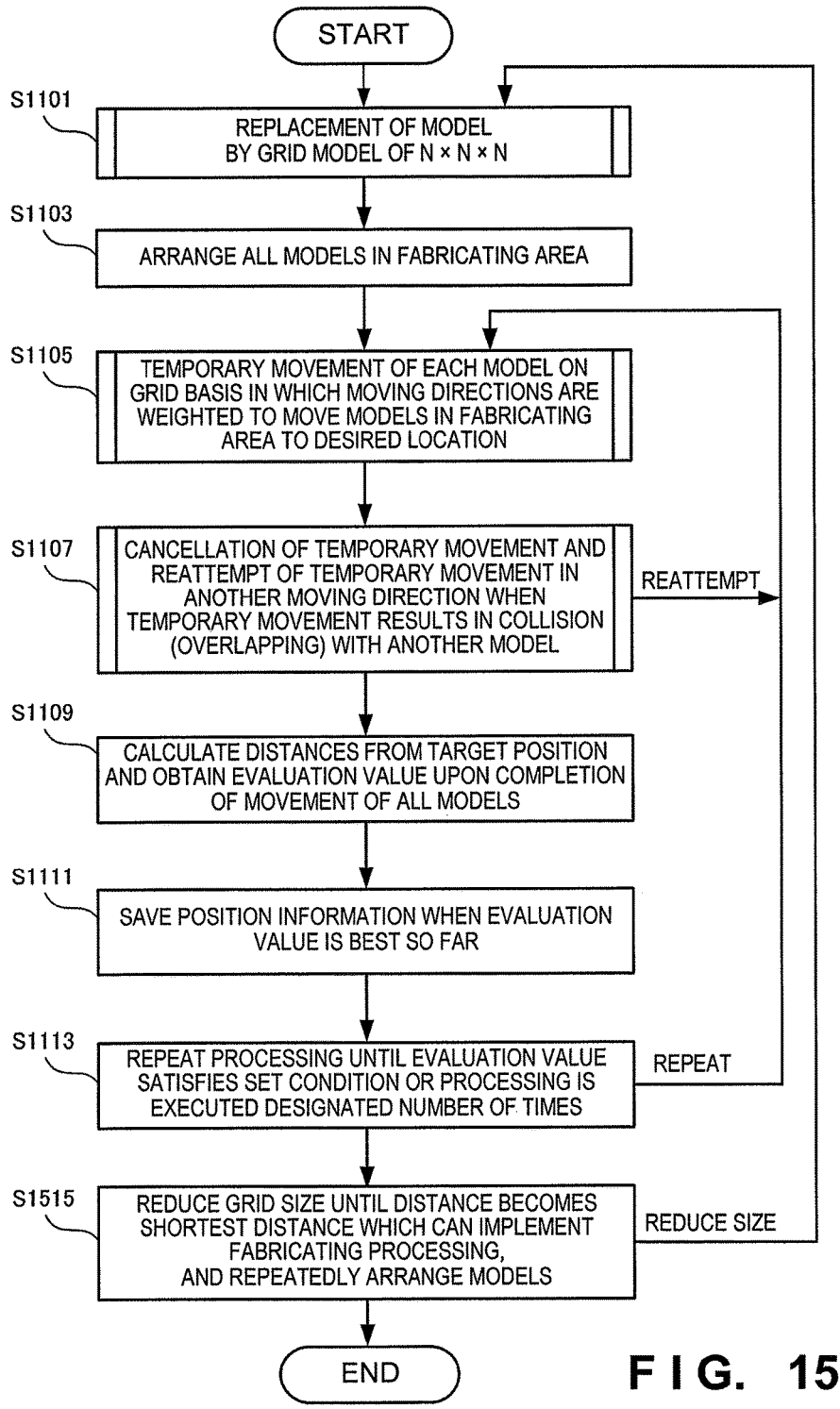
FIG. 15 is a flowchart illustrating the procedure of three-dimensional fabricating model arrangement processing by an information processing apparatus according to the third embodiment of the present invention.

FIG. 15 is a flowchart illustrating the procedure of a three-dimensional fabricating model arrangement processing by the information processing apparatus 310 according to this embodiment. This flowchart is executed by a CPU 810 shown in FIG. 8 by using a RAM 840, thereby implementing the functional component, especially, a three-dimensional fabricating model arrangement unit 312 of an information processing apparatus 310 shown in FIG. 3. Note that the same step numbers as those in FIG. 11 denote the same steps in FIG. 15 and a description thereof will be omitted.

Upon completion of arrangement with a given grid size, the information processing apparatus 310 reduces the grid size until the distance between three-dimensional fabricated objects becomes a shortest distance which can implement fabricating processing, and repeatedly arranges models in step S1515.

According to this embodiment, it is possible to accurately combine and arrange a plurality of three-dimensional fabricating model by simple processing by gradually reducing the size of cubic grids.

[Fourth Embodiment]

A three-dimensional fabricating model arrangement in an information processing apparatus according to the fourth embodiment of the present invention will be described. The three-dimensional fabricating model arrangement according to this embodiment is different from that according to the second or third embodiment in that an arrangement suitable for laminating and fabricating is implemented in consideration of the relationship with the laminating and fabricating direction of three-dimensional fabricated objects in the arrangement of three-dimensional fabricating models. The remaining components and operations are the same as those in the second or third embodiment. Thus, the same reference numerals denote the same components and operations and a detailed description thereof will be omitted.

<<Operation Overview of Three-Dimensional Fabricating Model Arrangement>>

Figure 16:
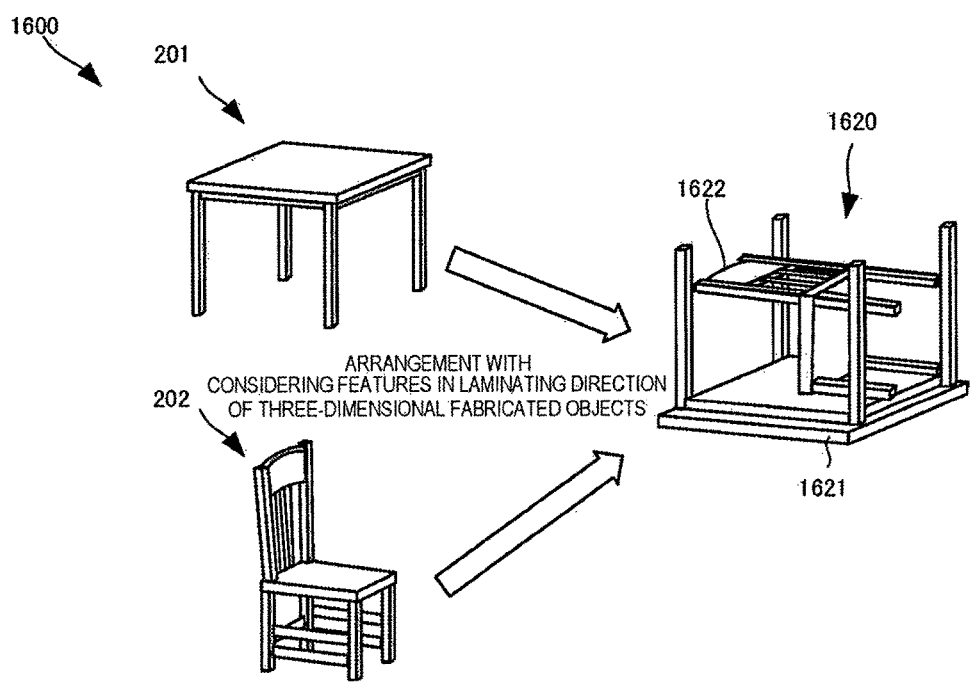
FIG. 16 is a view showing an operation overview of a three-dimensional fabricating model arrangement according to the fourth embodiment of the present invention.

FIG. 16 is a view showing an operation overview of a three-dimensional fabricating model arrangement 1600 according to this embodiment. Note that the same reference numerals as those in FIG. 2A denote the same elements in FIG. 16 and a description thereof will be omitted.

FIG. 16 assumes that the backrest of a chair 202 has a fine pattern. It is also assumed that it is desirable to laminate the top of the desk first, instead of laminating and fabricating the legs of the desk first.

In consideration of the above conditions, repeating movement and overlap determination of the three-dimensional grid aggregate model of the desk and that of the chair results in a final arrangement 1620 considering the features in the laminating direction of three-dimensional fabricated objects. In the final arrangement 1620 considering the features, a three-dimensional fabricating model 1621 of the desk is arranged so that the top is set at the lower position, and a three-dimensional fabricating model 1622 of the chair is arranged to be included in the outer shape of the desk, and arranged so that the backrest is set in a laminating plane direction.

(Arrangement Control Parameter Table)

Figure 17:
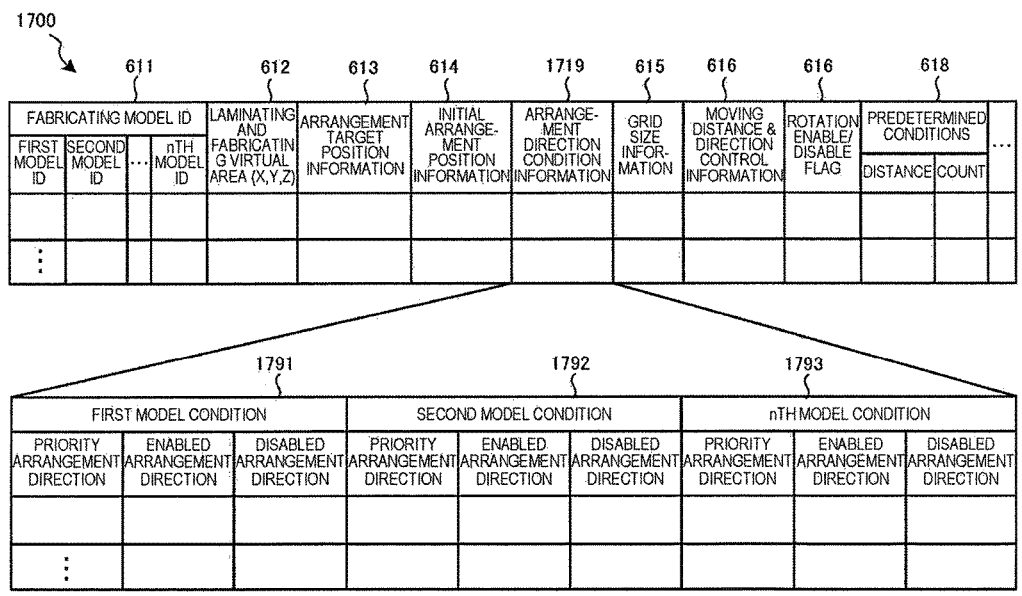
FIG. 17 is a table showing the structure of an arrangement control parameter table according to the fourth embodiment of the present invention.

FIG. 17 is a table showing the structure of an arrangement control parameter table 1700 according to this embodiment. Note that the same reference numerals as those in FIG. 6A denote the same elements in FIG. 17 and a description thereof will be omitted.

The arrangement control parameter table 1700 stores arrangement direction condition information 1719 indicating arrangement direction conditions. The arrangement direction condition information 1719 includes a first model condition 1791, a second model condition 1792, and an nth model condition 1793 as laminating characteristics of the first three-dimensional fabricating model. Each model condition includes a priority arrangement direction, an enabled arrangement direction, and a disabled arrangement direction.

(Combination Search Table)

FIG. 18 is a table showing the structure of a combination search table 1800 according to this embodiment. Note that the same reference numeral as those in FIG. 10 denote the same elements in FIG. 18 and a description thereof will be omitted.

The combination search table 1800 stores a first aggregate model 1801 and an nth aggregate model 1802. Each aggregate model stores a priority arrangement as a priority arrangement direction and a disabled arrangement prohibition as a disabled arrangement direction. Each aggregate model also stores a moving direction including rotation of a three-dimensional grid aggregate model decided with reference to the priority arrangement and arrangement prohibition.

<<Three-Dimensional Fabricating Model Arrangement Processing by Information Processing Apparatus>>

FIG. 19 is a flowchart illustrating the procedure of three-dimensional fabricating model arrangement processing by an information processing apparatus 310 according to this embodiment. This flowchart is executed by a CPU 810 shown in FIG. 8 by using a RAM 840, thereby implementing the functional component, especially, a three-dimensional fabricating model arrangement unit 312 of an information processing apparatus 310 shown in FIG. 3. Note that the same step numbers as those in FIG. 11 denote the same steps in FIG. 19 and a description thereof will be omitted.

After generating three-dimensional grid aggregate models from three-dimensional fabricating models in step S1101, the information processing apparatus 310 arranges all the three-dimensional grid aggregate models to be fabricated together in a virtual area (fabricating area) in consideration of the pieces of information of the priority arrangement and the disabled arrangement in step S1903.

(Combination Search Processing)

Figure 20:
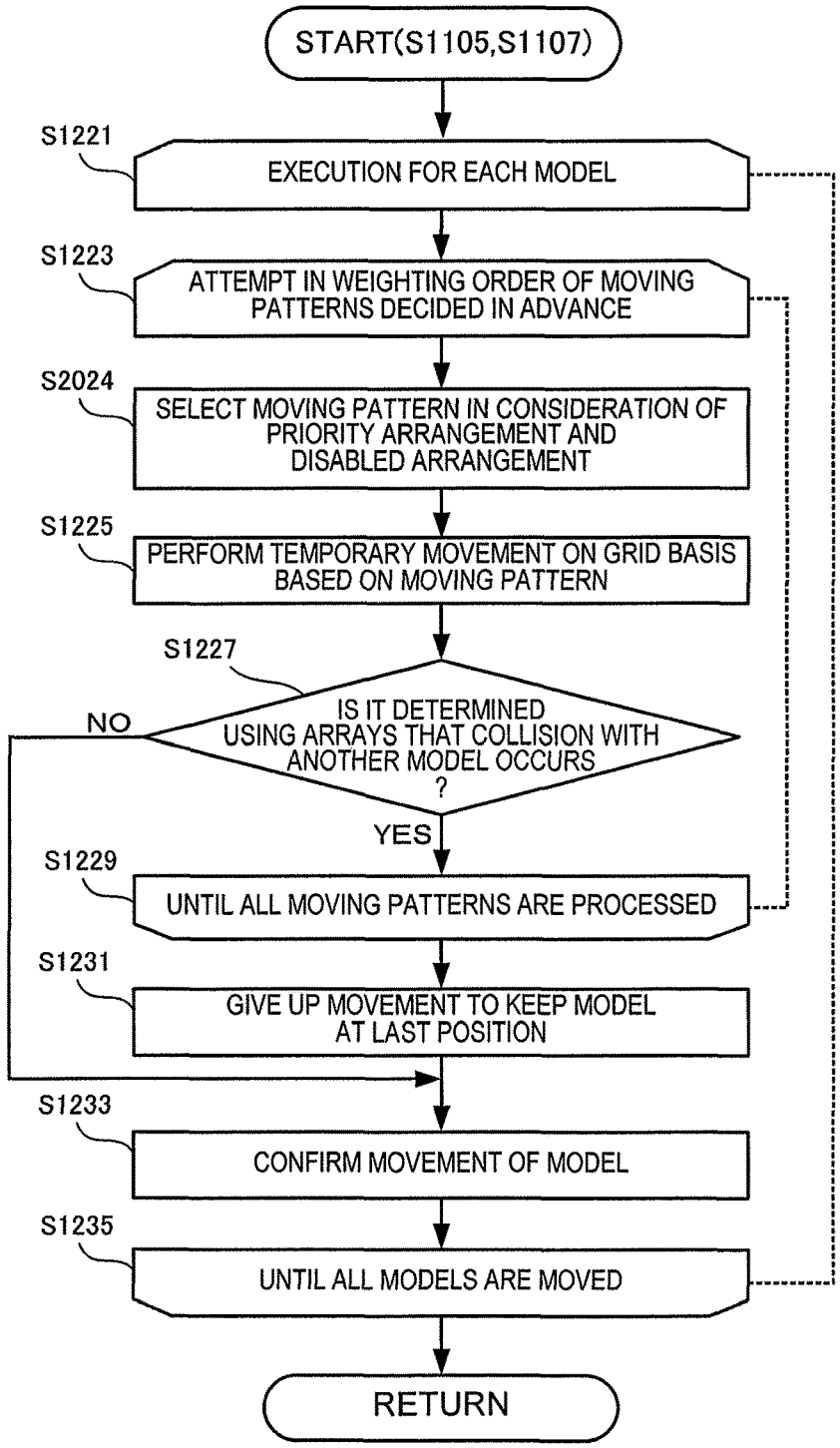
FIG. 20 is a flowchart illustrating the procedure of combination search processing according to the fourth embodiment of the present invention.

FIG. 20 is a flowchart illustrating the procedure of combination search processing (S1105 and S1107) according to this embodiment. Note that the same step numbers as those in FIG. 12B denote the same steps in FIG. 20 and a description thereof will be omitted.

In step S2024, the information processing apparatus 310 selects a moving pattern in consideration of the priority arrangement and prohibited arrangement.

According to this embodiment, it is possible to implement a combined arrangement of a plurality of three-dimensional fabricating models appropriate for laminating and fabricating by simple processing in consideration of the relationship with the laminating and fabricating direction of three-dimensional fabricated objects in the arrangement of the three-dimensional fabricating models.

[OTHER EMBODIMENTS]

In the above embodiments, cubes are set as three-dimensional grids. However, depending on three-dimensional fabricating target objects to be laminated and fabricated, rectangular parallelepipeds or other polyhedrons may be used. Alternatively, an aggregate model obtained by combining cubes, rectangular parallelepipeds, or other polyhedrons may be used.

Furthermore, in the above embodiments, a simple example in which an aggregate model including a three-dimensional fabricating model is moved on a grid basis or priority levels or weights are given to moving directions to perform movement has been explained. For example, it is possible to cause a combination of three-dimensional fabricating models to converge to a more appropriate combination solution at a higher speed by introducing a "combinatorial optimization" method such as a genetic algorithm or a method of "selecting a shortest path to an optimum solution".

The three-dimensional fabricating system according to each of the above embodiments includes an apparatus that generates three-dimensional fabricating models, an apparatus (information processing apparatus) that arranges the three-dimensional models for the three-dimensional fabricating apparatus, and a three-dimensional fabricating apparatus (3D printer) separately. However, even if these apparatuses are formed by one or two apparatuses or a different functional arrangement, it is possible to obtain the same effects. In this case, for example, an information processing apparatus includes a model generator that generates three-dimensional fabricating models from data representing three-dimensional fabricated objects, and a fabricating data transmitter that generates fabricating data of the three-dimensional fabricated objects based on the data of the three-dimensional fabricating models and arrangement data and transmits the data to a three-dimensional fabricated object laminating and fabricating apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program. The present invention specifically incorporates at least a non-transitory computer readable medium storing a program for causing the computer to execute the processing steps included in the above-described embodiments.

The invention claimed is:

1. An information processing apparatus for supplying data representing a plurality of three-dimensional fabricating models to a laminating and fabricating apparatus for fabrication of a plurality of three-dimensional objects in a desired arrangement, the information processing apparatus comprising:

a grid generator that generates three-dimensional grids by dividing a three-dimensional virtual area, which represents a fabricating area in the laminating and fabricating apparatus, into grids with each of the grids being of a predetermined size;

a converter that converts the plurality of three-dimensional fabricating models into a plurality of aggregate models, wherein each of the plurality of aggregate models consists of a set of the three-dimensional grids and wherein each set of the three-dimensional grids represents a respective one of the plurality of three-dimensional fabricating models;

a moving unit that is configured for (a) repeatedly moving the plurality of aggregate models relative to one another sequentially in successive of a plurality of predetermined directions within the three-dimensional virtual area with each of the plurality of aggregate models being moved as a unit until a desired arrangement of the plurality of aggregate models is obtained, (b) confirming a temporary movement of the plurality of aggregate models relative to one another in a first of the successive predetermined directions when any two of the models have not overlapped, and (c) canceling the temporary movement of the plurality of aggregate models relative to one another in the first of the successive predetermined directions when at least two of the plurality of aggregate models have overlapped and moving the plurality of aggregate models relative to one another in a next of the successive predetermined directions that is different from the first of the successive predetermined directions; and an arrangement determiner that determines if an arrangement of the plurality of aggregate models satisfies a predetermined condition such that data as to the arrangement of the plurality of aggregate models, which data represents an arrangement of the plurality of three-dimensional fabricating models, are suitable for supplying to the lamination and fabricating apparatus for the fabrication of the plurality of three-dimensional objects;

wherein the predetermined size of the grids is a size sufficient to enable the data as to the arrangement of the plurality of aggregate models to include constituent parts of each of the plurality of three-dimensional fabricating models with adequate spacing between the constituent parts of respective of the plurality of three-dimensional fabricating models to enable the laminating and fabricating apparatus to fabricate the plurality of three-dimensional objects.

2. The information processing apparatus according to claim 1, wherein the three-dimensional grids are cubes.

3. The information processing apparatus according to claim 1, wherein
said converter includes an initial arrangement unit that initially arranges the plurality of three-dimensional fabricating models in the virtual area.

4. The information processing apparatus according to claim 3, wherein
said initial arrangement unit initially arranges the plurality of aggregate models in a periphery of the virtual area, and
said moving unit moves the plurality of aggregate models toward a center of the virtual area.

5. The information processing apparatus according to claim 3, wherein
said initial arrangement unit initially arranges the plurality of aggregate models at a center of the virtual area, and
said moving unit moves the plurality of aggregate models toward a periphery of the virtual area.

6. The information processing apparatus according to claim 3, wherein
said initial arrangement unit initially arranges each three-dimensional fabricating model in the virtual area in consideration of a priority fabricating direction and a disabled fabricating direction of the three-dimensional fabricated object, and
said moving unit relatively moves the plurality of aggregate models without overlapping each other in the virtual area in consideration of the priority fabricating direction and the disabled fabricating direction.

7. The information processing apparatus according to claim 3, wherein said moving unit weights a moving direction of the aggregate model to give a priority level.

8. The information processing apparatus according to claim 1, wherein said moving unit includes a rotator that rotates the plurality of aggregate models on a three-dimensional grid basis.

9. The information processing apparatus according to claim 8, wherein said rotator rotates the plurality of aggregate models by an angle first from the group consisting of of $\pm 90°$ and $180°$.

10. The information processing apparatus according to claim 1, wherein the predetermined condition includes either a first case in which distances between a predetermined position and the plurality of aggregate models in the virtual area become shorter than a first threshold, or a second case in which a number of moving operations by said moving unit exceeds a second threshold.

11. The information processing apparatus according to claim 1, further comprising:
a reduction unit that gradually reduces the size of the three-dimensional grids,
wherein said converter, said moving unit, and said arrangement determiner carry out processes that are repeated while gradually reducing the size of the three-dimensional grids by said reduction unit.

12. The information processing apparatus according to claim 1, further comprising:
a model generator that generates the three-dimensional fabricating models from the data representing the three-dimensional fabricated objects; and
a fabricating data transmitter that generates data for fabricating the three-dimensional fabricated objects based on data of the three-dimensional fabricating models and data of the arrangement, and transmits the generated data to the laminating and fabricating apparatus.

13. The information processing apparatus according to claim 1, further comprising an aggregate model overlap determiner that determines whether the plurality of aggregate models overlap each other after movement by the moving unit and an arrangement output unit that outputs the data as to the arrangement of the plurality of aggregate models to the laminating and fabricating apparatus.

14. A method for arranging grids representing three-dimensional fabricating models for use in fabrication of a plurality of three-dimensional objects in a desired arrangement, the method comprising the steps of:
generating three-dimensional grids by dividing a three-dimensional virtual area, which represents a fabricating area in a laminating and fabricating apparatus for fabricating the plurality of three-dimensional objects, into a plurality of grids, wherein each of the grids is of a predetermined size;
converting the plurality of three-dimensional fabricating models into a plurality of aggregate models, wherein each of the plurality of aggregate models consists of a set of the three-dimensional grids and wherein each set of the three-dimensional grids represents a respective one of the plurality of three-dimensional fabricating models;
repeatedly moving the plurality of aggregate models relative to one another sequentially in successive of a plurality of predetermined directions within the three-dimensional virtual area and with each of the plurality of aggregate models being moved as a unit until a desired arrangement of the plurality of aggregate models is obtained, the moving step including (a) confirming a temporary movement of the plurality of aggregate models relative to one another in a first of the successive predetermined directions when any two of the plurality of aggregate models have not overlapped, and (b) canceling the temporary movement of the plurality of aggregate models in the first of the successive predetermined directions and causing movement of the plurality of aggregate models in a next of the successive predetermined directions that is different from the first of the successive predetermined directions when at least two of the plurality of aggregate models have overlapped; and determining if an arrangement of the plurality of aggregate models satisfies a predetermined condition and, if so, storing data showing the arrangement of the plurality of aggregate models that satisfies the predetermined condition for use in fabrication of the plurality of three-dimensional objects;

wherein the predetermined size of the grids is a size sufficient to enable the data as to the arrangement of the plurality of aggregate models to include constituent parts of each of the plurality of three-dimensional fabricating models with adequate spacing between the constituent parts of respective of the plurality of three-dimensional fabricating models to enable the laminating and fabricating apparatus to fabricate the plurality of three-dimensional objects.

15. The method according to claim 14, further comprising outputting the data showing the arrangement of the plurality of aggregate models to the laminating and fabricating apparatus.

16. A non-transitory computer-readable storage medium storing a program for arranging three-dimensional fabricating models, for causing a computer to execute a method comprising the steps of:

generating three-dimensional grids by dividing a three-dimensional virtual area, which represents a fabricating area in a laminating and fabricating apparatus for fabricating the plurality of three-dimensional objects, into a plurality of grids, wherein each of the grids is of a predetermined size;

converting the plurality of three-dimensional fabricating models into a plurality of aggregate models, wherein each of the plurality of aggregate models consists of a set of the three-dimensional grids and wherein each set of the three-dimensional grids represents a respective one of the plurality of three-dimensional fabricating models;

repeatedly moving the plurality of aggregate models relative to one another sequentially in successive of a plurality of predetermined directions within the three-dimensional virtual area and with each of the plurality of aggregate models being moved as a unit until a desired arrangement of the plurality of aggregate models is obtained, the moving step including confirming a temporary movement of the plurality of aggregate models relative to one another in a first of the successive predetermined directions when any two of the plurality of aggregate models have not overlapped, and canceling the temporary movement of the plurality of aggregate models in the first of the successive predetermined directions and causing movement of the plurality of aggregate models in a next of the successive predetermined directions that is different from the first of the successive predetermined directions when at least two of the plurality of aggregate models have overlapped; and determining if an arrangement of the plurality of aggregate models satisfies a predetermined condition and, if so, storing data showing the arrangement of the plurality of aggregate models that satisfies the predetermined condition for use in fabrication of the plurality of three-dimensional objects;

wherein the predetermined size of the grids is a size sufficient to enable the data as to the arrangement of the plurality of aggregate models to include constituent parts of each of the plurality of three-dimensional fabricating models with adequate spacing between the constituent parts of respective of the plurality of three-dimensional fabricating models to enable the laminating and fabricating apparatus to fabricate the plurality of three-dimensional objects.

17. The non-transitory computer-readable storage medium according to claim 16, which causes the computer to execute the further step of outputting the data showing the arrangement of the plurality of aggregate models to the laminating and fabricating apparatus.

18. A three-dimensional fabricating system comprising:

a model generator that generates a plurality of three-dimensional fabricating models from data representing a plurality of three-dimensional fabricated objects;

a model arrangement unit that arranges a plurality of aggregate models representing the plurality of three-dimensional fabricating models in a three-dimensional virtual area corresponding to a fabricating area where the plurality of three-dimensional fabricated objects are fabricated; and a laminating and fabricating unit that fabricates the plurality of three-dimensional fabricated objects in the fabricating area according to a result of arranging the plurality of aggregate models by said model arrangement unit, said model arrangement unit including:

a grid generator that generates three-dimensional grids by dividing a three-dimensional virtual area, which represents a fabricating area in the laminating and fabricating apparatus, into grids with each of the grids being of a predetermined size;

a converter that converts the plurality of three-dimensional fabricating models into the plurality of aggregate models, wherein each of the plurality of aggregate models consists of a set of the three-dimensional grids and wherein each set of the three-dimensional grids represents a respective one of the plurality of three-dimensional fabricating models;

a moving unit that is configured for (a) repeatedly moving the plurality of aggregate models relative to one another sequentially in successive of a plurality of predetermined directions within the three-dimensional virtual area with each of the plurality of aggregate models being moved as a unit until a desired arrangement of the plurality of aggregate models is obtained, (b) confirming a temporary movement of the plurality of aggregate models relative to one another in a first of the successive predetermined directions when any two of the models have not overlapped, and (c) canceling the temporary movement of the plurality of aggregate models relative to one another in the first of the successive predetermined directions when at least two of the plurality of aggregate models have overlapped and moving the plurality of aggregate models relative to one another in a next of the successive predetermined directions that is different from the first of the successive predetermined directions; and an arrangement determiner that determines if an arrangement of the plurality of aggregate models satisfies a predetermined condition such that data as to the arrangement of the plurality of aggregate models, which data represents an arrangement of the plurality of three-dimensional fabricating models, are suitable for supplying to the lamination and fabricating apparatus for the fabrication of the plurality of three-dimensional objects;

wherein the predetermined size of the grids is a size sufficient to enable the data as to the arrangement of the plurality of aggregate models to include constituent parts of each of the plurality of three-dimensional fabricating models with adequate spacing between the constituent parts of respective of the plurality of three-dimensional fabricating models to enable the laminating and fabricating apparatus to fabricate the plurality of three-dimensional objects.

19. The information processing apparatus according to claim 18, further comprising an aggregate model overlap determiner that determines whether the plurality of aggregate models overlap each other after temporary movement by the moving unit and an arrangement output unit that outputs the data as to the arrangement of the plurality of aggregate models to the laminating and fabricating apparatus.

* * * * *